(12) United States Patent
Kainec et al.

(10) Patent No.: US 7,375,304 B2
(45) Date of Patent: May 20, 2008

(54) SYSTEM AND METHOD PROVIDING AUTOMATED WELDING NOTIFICATION

(75) Inventors: Stephen M. Kainec, South Euclid, OH (US); Edward D. Hillen, Painesville, OH (US); George Daryl Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 542 days.

(21) Appl. No.: 11/005,586

(22) Filed: Dec. 6, 2004

(65) Prior Publication Data
US 2005/0103767 A1    May 19, 2005

Related U.S. Application Data

(63) Continuation-in-part of application No. 10/901,658, filed on Jul. 29, 2004, now Pat. No. 6,924,459, which is a continuation of application No. 10/264,833, filed on Oct. 4, 2002, now Pat. No. 6,809,292, which is a continuation of application No. 09/796,192, filed on Feb. 28, 2001, now Pat. No. 6,486,439, which is a continuation-in-part of application No. 09/770,064, filed on Jan. 25, 2001, now Pat. No. 6,624,388.

(60) Provisional application No. 60/542,891, filed on Feb. 9, 2004.

(51) Int. Cl.
*B23K 9/095* (2006.01)

(52) U.S. Cl. .................. 219/130.01; 228/103
(58) Field of Classification Search .......... 219/130.01, 219/130.21, 130.5; 228/103; 700/145
See application file for complete search history.

(56) References Cited

U.S. PATENT DOCUMENTS 4,697,239 A   9/1987   Sicard et al.
5,353,238 A   10/1994  Neef et al.

(Continued)

FOREIGN PATENT DOCUMENTS

EP       0463489       6/1991
WO    WO2004/004960 A1 *  1/2004

OTHER PUBLICATIONS

ArcLink Functional Specification, Engineering Document, The Lincoln Electric Company, Aug. 1997, pp. 1-38.

(Continued)

*Primary Examiner*—Clifford C Shaw
(74) *Attorney, Agent, or Firm*—Amin, Turocy & Calvin, LLP

(57) ABSTRACT

The present invention relates to a system and method that provide for automated notification to entities (e.g., individuals, groups of individuals, computers, systems . . . ) of welding system related information. The invention provides for determination of events and/or conditions that warrant automatic notification thereof to relevant entities. The notifications are conveyed via a most appropriate subset of available communication modes available. The system identifies most appropriate entities to receive the notification about the event, and optionally determines or infers state of the entities and conveys the notification via a communication mode (e.g., text, audio, graphical, video, combination thereof . . . ) and modality (e.g., wireless, Ethernet, cable, optical, telephone, e-mail, voicemail, pager, ghosting, instant messaging . . . ) that is most suitable given context/state of the event and entities.

34 Claims, 21 Drawing Sheets

U.S. PATENT DOCUMENTS

| | | |
|---|---|---|
| 5,463,555 A | 10/1995 | Ward et al. |
| 5,510,596 A * | 4/1996 | Xu et al. ............... 219/130.01 |
| 5,805,442 A | 9/1998 | Crater et al. |
| 5,808,885 A | 9/1998 | Dew et al. |
| 5,850,066 A | 12/1998 | Dew et al. |
| 5,859,847 A | 1/1999 | Dew et al. |
| 6,002,104 A | 12/1999 | Hsu |
| 6,018,729 A | 1/2000 | Zacharia et al. |
| 6,040,555 A | 3/2000 | Tiller et al. |
| 6,087,627 A | 7/2000 | Kramer |
| 6,486,439 B1 | 11/2002 | Spear et al. |
| 6,670,810 B2 * | 12/2003 | Duncan et al. .......... 324/244.1 |
| 6,797,921 B1 * | 9/2004 | Niedereder et al. ...... 219/130.5 |
| 7,045,742 B2 * | 5/2006 | Feichtinger et al. ........ 219/132 |
| 7,162,534 B2 * | 1/2007 | Schleiss et al. ............. 709/232 |
| 2002/0107825 A1 | 8/2002 | Manicke et al. |
| 2005/0252898 A1 * | 11/2005 | Blechinger et al. ...... 219/130.5 |

OTHER PUBLICATIONS

W.G. Rippey, et al., The Nist Automated Arc Welding Testbed, 7th International Conference on Computer Technology in Welding, San Francisco, CA, Jul. 8-11, 1997. p. 1-8.

\* cited by examiner

SYSTEM AND METHOD PROVIDING AUTOMATED WELDING NOTIFICATION

CROSS-REFERENCE TO RELATED APPLICATIONS

This application claims the benefit of U.S. patent application Ser. No. 60/542,891, filed Feb. 9, 2004, entitled, "SYSTEM AND METHOD PROVIDING AUTOMATED WELDING INFORMATION EXCHANGE AND REPLACEMENT PART ORDER GENERATION." This application is also a Continuation-in-Part of U.S. patent application Ser. No. 10/901,658, filed Jul. 29, 2004, U.S. Pat. No. 6,924,459 entitled, "SYSTEM AND METHOD PROVIDING AUTOMATED WELDING INFORMATION EXCHANGE AND REPLACEMENT PART ORDER GENERATION", which is a continuation of U.S. patent application Ser. No. 10/264,833, which was filed on Oct. 4, 2002 (now U.S. Pat. No. 6,809,292, issued Oct. 26, 2004), entitled, "SYSTEM AND METHOD PROVIDING AUTOMATED WELDING INFORMATION EXCHANGE AND REPLACEMENT PART ORDER GENERATION", which is a continuation of U.S. Ser. No. 09/796,192, filed Feb. 28, 2001 (now U.S. Pat. No. 6,486,439, issued Nov. 26, 2002), entitled, "SYSTEM AND METHOD PROVIDING AUTOMATED WELDING INFORMATION EXCHANGE AND REPLACEMENT PART ORDER GENERATION", and which is also a Continuation-in-Part of U.S. Ser. No. 09/770,064, filed Jan. 25, 2001 (now U.S. Pat. No. 6,624,388, issued Sep. 25, 2003), entitled, "SYSTEM AND METHOD PROVIDING DISTRIBUTED WELDING ARCHITECTURE". The entireties of all of these applications are incorporated herein by reference.

TECHNICAL FIELD

The subject invention relates generally to computer and welding systems, and more particularly to a system and method providing local and/or remote notifications regarding welding systems.

BACKGROUND OF THE INVENTION

Welding systems reside at the core of the modem industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modem and more complex manufacturing operations however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall joining, fabrication and/or other production process. Thus, controlling, maintaining, servicing and supplying multiple and isolated locations in large centers, and/or across the globe, has become more challenging, time consuming and expensive.

The matrix of variables (e.g., performance, wear and tear, diagnostic, prognostic, throughput, quality, timeliness, robustness, extrinsic factors . . . ) results in situations where such variables need to be constantly monitored—which is very expensive. Lack of monitoring can lead to catastrophic failure of machines, lines, parts, leading to potential loss of revenue. However, it is not often practicable to have relevant entities continuously monitoring variables pertaining thereto.

In view of the above, it is submitted that there is an unsolved need for the subject invention, which addresses some of the aforementioned issues in a novel manner.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to a system and method that provide for automated notification to entities (e.g., individuals, groups of individuals, computers, systems . . . ) of welding system related information. The invention provides for determination of events and/or conditions that warrant automatic notification thereof to relevant entities. The notifications are conveyed via a most appropriate subset of available communication modes available. For example, in accordance with one aspect of the invention, an event results triggering the system to generate a notification regarding the event. The system identifies most appropriate entities to receive the notification about the event, and optionally determines or infers state of the entities and conveys the notification via a communication mode (e.g., text, audio, graphical, video, combination thereof . . . ) and modality (e.g., wireless, Ethernet, cable, optical, telephone, e-mail, voicemail, pager, ghosting, instant messaging . . . ) that is most suitable given the context/state of the event and entities.

Notifications can be applied in a plurality of different welding system settings, configurations, and applications. In one example, a system is provided for notifying people via a configurable address book that is employed to generate e-mail (or other type notification) when certain events occur in the welding system. The system includes a welder adapted with the configurable address book that is attached to a mail server or through an Ethernet network, for example. The welder monitors itself and the welding system for certain events. When one or more of these events are detected, the welder can search the address book for any recipients that desire to be notified when the event occurs. The address book can include configuration information associated with respective addresses for determining which recipients to notify. If one or more recipients to be notified are identified, the system can then automatically construct an e-mail or other type notification, whereby the subject and body of respective messages such as e-mail can be determined by the event that was detected. Also, a real time clock can be employed to time-stamp events, wherein such information can be logged and/or utilized for later system diagnosis.

Another aspect of the invention provides for migrating the notification from entity to entity until one has responded to the notification affirmatively and/or appropriate action has been taken regarding the event. Moreover, another aspect of the invention provides for an entity to employ delegates on its behalf to receive and optionally respond to the notification, for example during unavailability of the initial entity.

The invention can employ utility-based analyses in connection with determining if, when, to whom, and in what manner to convey notifications where the cost associated with respective processes in connection with a notification is weighed against the benefit of the notification. Yet another aspect of the invention provides for employing rule-based, statistical-based and/or probabilistic-based analytical techniques in connection with generating and conveying the notifications.

The invention can be applied to convey notifications about state, context, performance, trends, history, diagnoses, prognoses, device or system health, wear & tear, throughput, efficiency, operators, external conditions, environmental conditions, power supply, inventory, parts, maintenance, predictive maintenance, replacements, load balancing, output quality, output quantity, temperature, pressure, electrodes, . . . and numerous other types of information germane to welding systems and the like.

The following description and the annexed drawings set forth in detail certain illustrative aspects of the invention. These aspects are indicative, however, of but a few of the various ways in which the principles of the invention may be employed and the invention is intended to include all such aspects and their equivalents. Other advantages and novel features of the invention will become apparent from the following detailed description of the invention when considered in conjunction with the drawings.

DETAILED DESCRIPTION OF THE INVENTION

The subject invention relates to a system and methodology to provide a distributed welding architecture wherein a plurality of welders and/or other remote systems provide automated information exchange and ordering via a higher-level network architecture adapted to the welding process. As used in this application, the terms "component," "classifier," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1A:
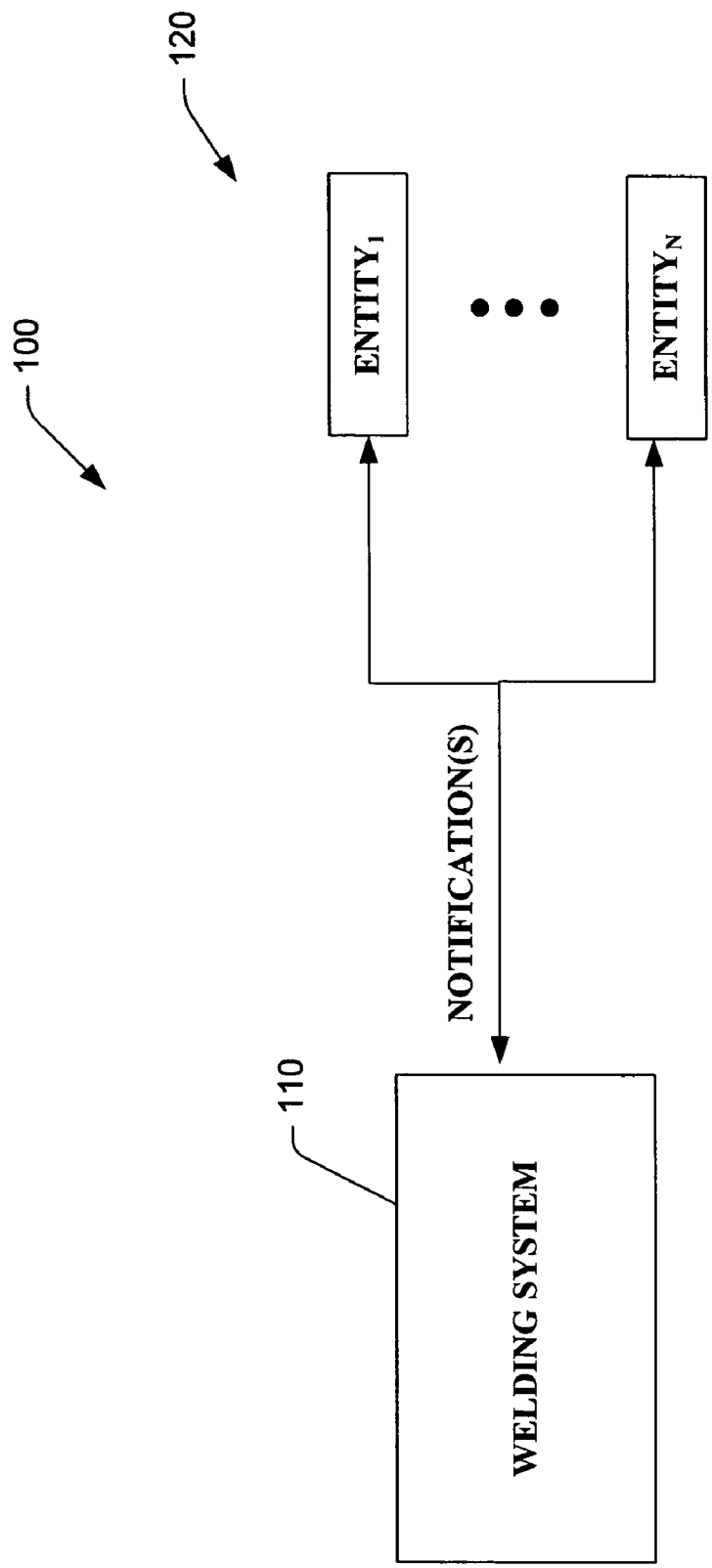
FIG. 1a is a schematic block diagram illustrating a high-level welding system notification architecture in accordance with an aspect of the subject invention.

FIG. 1a is a high-level notification system 100 in accordance with the invention. A welding system 110 conveys and receives notification related information regarding the welding system to a subset of a plurality of "N" entities 120 (where N is an integer). An entity in accordance with the invention can be an individual, a group of individuals, a machine, a plurality of machines, an application program, a computer or network of computers, and/or a combination thereof. The system 100 provides for automated notification to a subset of the entities of welding system related information. The system 100 determines events and/or conditions that warrant automatic notification thereof to the relevant subset of entities 120. The notifications are conveyed via a most appropriate subset of available communication modes available. For example, upon a notification-worthy event occurring, the system 100 generates a notification regarding the event. The system 100 also identifies most appropriate entities to receive the notification about the event, and optionally determines or infers state of the entities and conveys the notification via a communication mode (e.g., text, audio, graphical, video, combination thereof . . . ) and modality (e.g., wireless, Ethernet, cable, optical, telephone, e-mail, voicemail, pager, ghosting, instant messaging . . . ) that is most suitable given the context/state of the event and entities.

The system 100 can be employed to convey notifications about state, context, performance, trends, history, diagnoses, prognoses, device or system health, wear & tear, throughput, efficiency, operators, external conditions, environmental conditions, power supply, inventory, parts, maintenance, predictive maintenance, replacements, load balancing, output quality, output quantity, temperature, pressure, electrodes, . . . and numerous other types of information germane to welding systems and the like. Moreover, the information may include alerts, prompts, alarms, reports, documentation such as operating and service manuals, and include other information associated with the welding system. Remote diagnostic assistance can be provided that interacts with maintenance personnel prompting them to check various components in the welding system while providing test procedures and suitable technical documentation such as machine schematics. Testing and calibration of the welding system can also be provided along with scheduled system maintenance, service and downtime via the interactive process. The welding system 110 can link to remote order, inventory and distribution servers in order that replacement components or other items such as welder procedures in a downloadable program format can automatically be ordered as a result of interactive processes. Orders may be initiated, for example, by selecting components and/or welder programs from the retrieved welding system information. An operator can initiate a purchase order by selecting the component/procedure via a networked user interface.

The welding system can execute a plurality of functional objects to interact with various portions of a welding process. These objects may be invoked from a remote system via network sockets adapted to the welder and associated with the network server and the objects. The remote system and/or other welding system may "bootstrap" components and/or applications for interacting with the functional objects (e.g., weld controller, monitor, communications tasks, applets) provided by the system 110. The system 110 may also include interacting with web pages for example, and may provide access to a remote system/browser and/or local browser to interface with the welder. The remote system includes at least one standard socket (e.g., HTTP) for web communications and at least one custom socket (e.g., Welding Application Socket) to exchange information between the welder and the remote system. For example, the standard socket can be an HTTP socket, an FTP socket, a TELNET socket, and/or other network socket. It is noted that the terms "web" and "http" are substantially interchangeable, however, "web" does not include FTP or TELNET, which are separate protocols. The standard socket enables the remote system to load a variety of applications and/or tools that facilitate system performance and access to the applications and/or tools. For example, the applications may invoke or bootstrap Welding Application sockets that encapsulate a welding system's native addressing and command arguments, wherein suitable routing and request arguments may be served by a welder's native network and operating system. The network may employ User Datagram Protocol (UDP) protocol, wherein a client system may proxy requests over the socket to/from a welder's native system. The welder's native system may include one or more control processors and a native welding Local Area Network (LAN) connecting the control processors with one or more logical processes and/or "objects" executing on the control processor. A database provides access to methods/properties exhibited by each object.

Figure 1B:
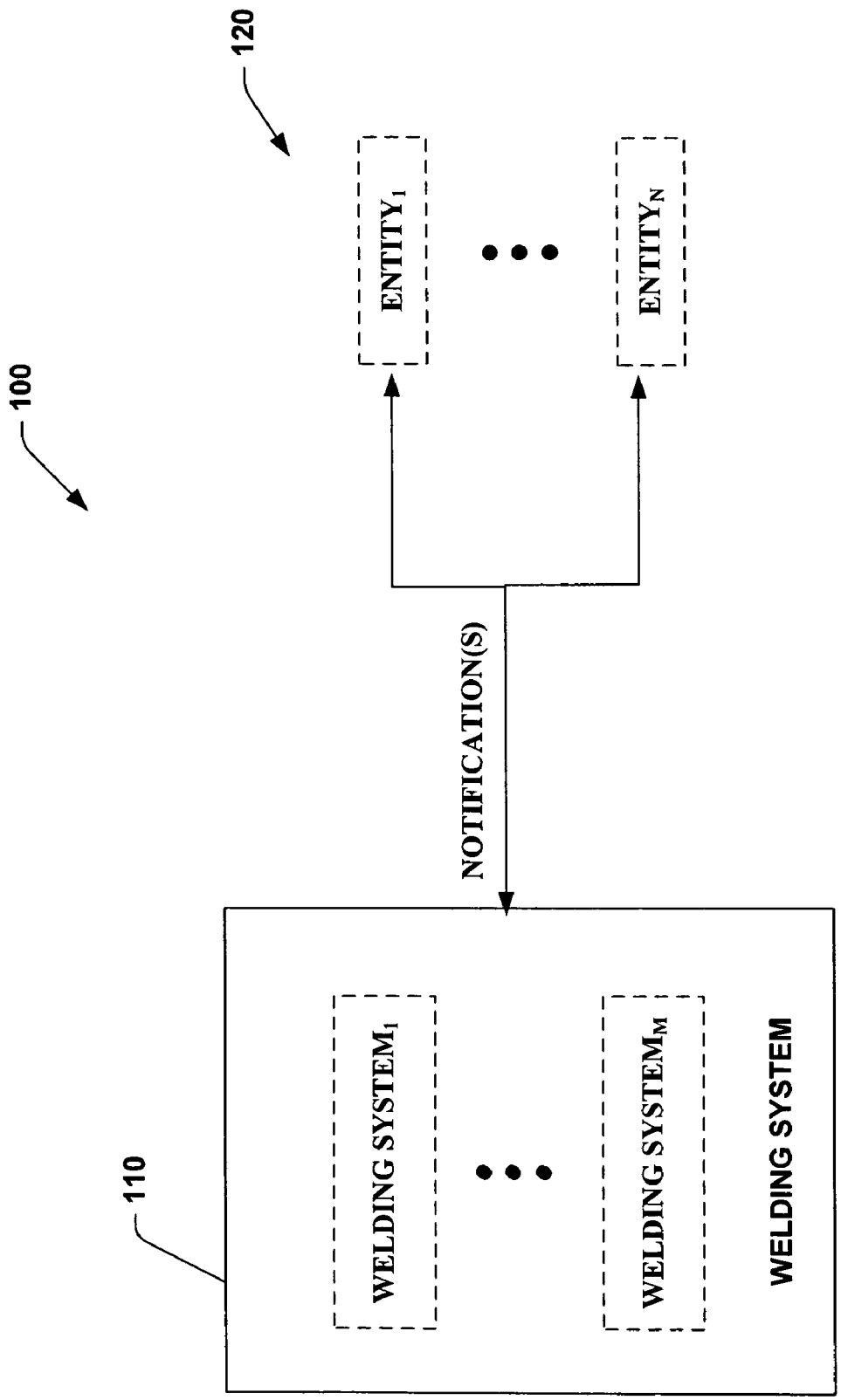
FIG. 1b is a schematic block diagram illustrating a high-level distributed welding system notification architecture in accordance with an aspect of the invention.

As depicted in FIG. 1b, the welding system 110 can comprise a plurality of sub-systems. Thus, for example, the welding system 110 can be a single welder, a network of welders, or several networks of welders and related machines and/or applications, etc.

Figure 1C:
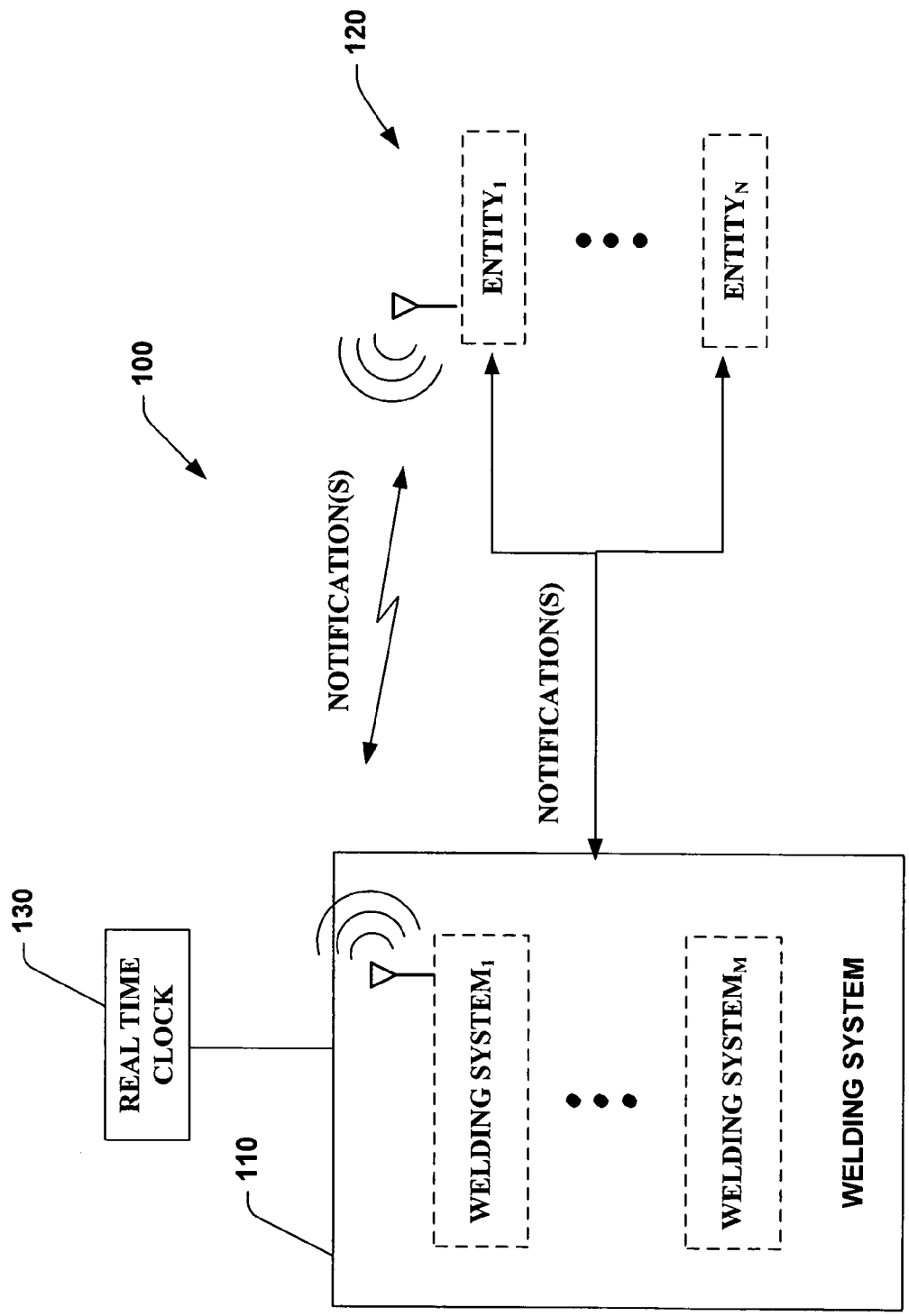
FIG. 1c is a schematic block diagram illustrating a high-level distributed welding system notification architecture that employs wireless communication in accordance with an aspect of the invention.

FIG. 1c illustrates that the notifications can be conveyed in a plurality of manners. The notification system 100 can employ optical communication schemes, wireless (e.g., RF, IR), hard-wired, Internet, broadband . . . Moreover, with such communication foundations, any of a plurality of suitable communications modalities (e.g., e-mail, voicemail, television, audio, text, files, radio, instant messaging, paging, cell-phone, car phone, personal data assistant communication schemes, etc.) can be employed. Additionally, the notification system 100 can employ a real time clock system 130 to time-stamp the notification(s), wherein such information can be logged and or/utilized for later system diagnostics.

Figure 1D:
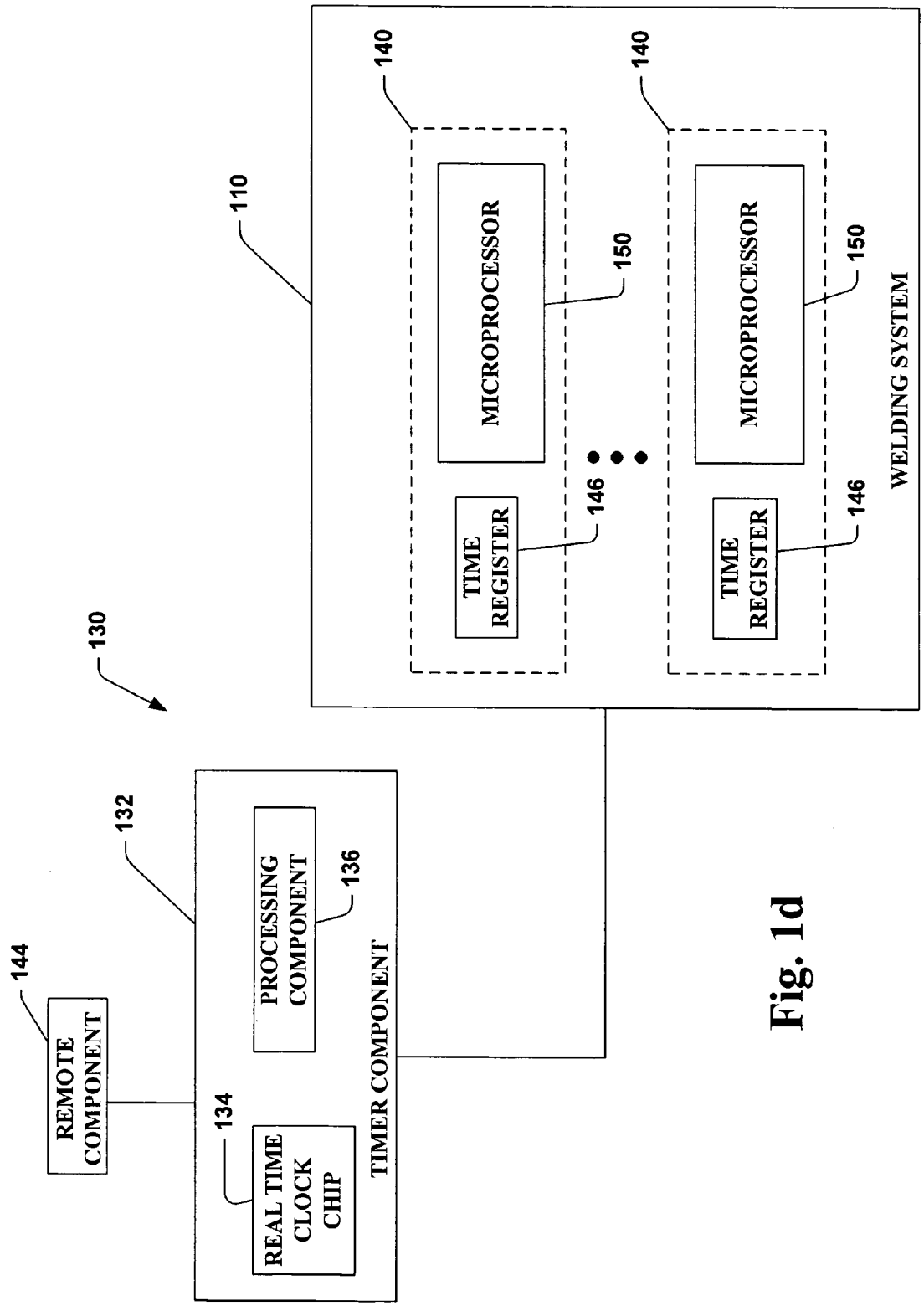
FIG. 1d is a schematic block diagram of a real time clock system in accordance with an aspect of the invention.

FIG. 1d illustrates a real time clock system 130 that can be employed with the invention. The real time clock system 130 can include a timer component 132 coupled to a remote component 144 wherein the timer component 132 can be a subcomponent of a printed circuit board, for example. The timer component 132 can include a processing component 136 that can be a microprocessor, and a real time clock chip 134. The real time clock chip 134 can include various components such as one or more batteries, crystal(s) or register(s). The register(s) can hold a variety of values such as month/day/year (m/d/y) or hour/minute/second (h/m/s) or any value or combination of values to provide time stamping of notifications. The remote component 144 coupled to the timer component 132 may be a computer, atomic clock or other device capable of synchronizing the internal timer component 132. The processing component 136 can be any component capable of processing data.

The timer component 132 is coupled to a welding system 110 comprised of a plurality of sub-systems. Each sub-system can include individual processing systems 140 which can be a printed circuit board that includes a microprocessor 150 and a time register 146. The individual processing system(s) 140 does not contain a real time clock chip. Instead, the time function is provided by the timer component 132. Thus, when the individual processing system(s) 140 is not coupled to the timer component 132 there is no real time function available from that particular processing system 140 for time-stamping. Upon start-up and periodically while the individual processing system(s) 140 are coupled to the timer component 132, the timer component 132 will update the processing system(s) 140 to ensure accurate time-stamping of the notifications. The local bus can employ various protocols and/or standards to facilitate communication between the timer component 132 and the welding system 110 such as RS-232, analog, digital, serial and the like.

Figure 2:
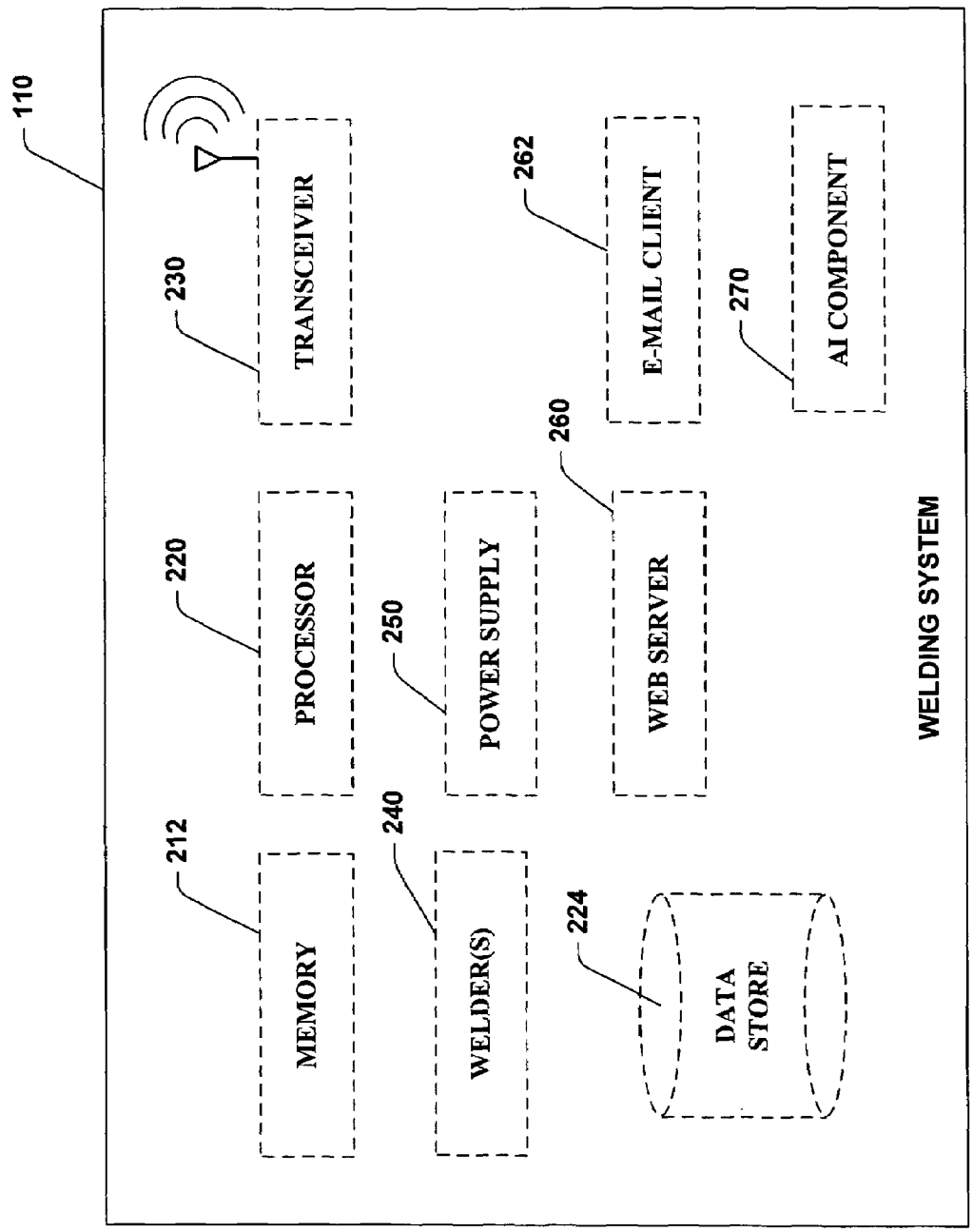
FIG. 2 is a schematic block diagram illustrating exemplary welding system components in accordance with an aspect of the invention.

FIG. 2 illustrates various components that can be employed by the welding system 110 of the subject invention. A memory 212 (volatile and/or non-volatile) can be employed to store information and programs associated with notifications in accordance with the invention. For certain types of information, persistent storage is preferred in order to mitigate loss thereof during power/device/application/ system failure. The memory 212 can comprise programs executed by a processor 220 to provide the functions as will be described and also variables and data necessary for the execution of those programs. For I/O modules, the memory 212 may also include an I/O table holding current state of inputs and outputs received from and transmitted to a welding controller via the I/O modules.

The processor component 220 carries out various functionality associated with the invention as described herein. It is to be appreciated that the processor can be a single microprocessor or a plurality of processors, for example. A transceiver component 230 provides for bi-directional wireless communications in accordance with the subject invention. The transceiver component can comprise any of a variety of suitable components (e.g., digital components, analog components . . . ) in order to effect wireless communications in accordance with the subject invention. Moreover, the transceiver component can also be employed in connection with hard-wired communications if desired. A power supply 250 provides power to the system 110—the power supply 250 can be wall powered, solar powered, battery powered, combination thereof, or any other suitable mechanism/scheme for powering the system 110.

One or more welders 240 optionally adapted with a network server and interface as described above can be part of the system 110. It is noted that the welder(s) 240 may also be included within a network of welders as will be described herein. Each welder(s) 240 may communicate over a network to a plurality of network-enabled devices. These devices may include a remote computer, an industrial controller, such as a programmable logic controller (plc), a robot, and/or other network capable device (e.g., TCP device). In accordance with the invention, the network enabled devices may open one or more welding protocol sockets (not shown) or network sockets and execute components or objects, such as an applet, to facilitate direct and timely access to the welder(s) 240. Each welder(s) 240 may include program components to control and monitor the welders and may utilize a plurality of welding protocol sockets to communicate with the program components and the network enabled devices. The welding protocol sockets may also facilitate communications between welders wherein one welder acts as a client and another welder acts as a server or vise versa and is illustrated as an operative connection. The system 110 may be integrated in an overall distributed architecture of plant floor control. This enables a welding process as well as other processes such as the robot and industrial controller to be monitored and controlled from one or more remote locations without sending systems engineers or operators to each process station to modify or diagnose the operating conditions of the welders.

The system 110 can also include a web server 260 or servers, for example, that provide remote browsing interactivity with the welding system 110. An embedded web browser may also be provided that can act as a client, for example, to other remote systems or welders. Other client functionality within the welding system 110, for example, may include an e-mail client 262 (e.g., SMTP server) to send messages to other network systems and/or devices.

A data store 224 provides for storing various types of data relating the welding system and operation thereof. The data store can include volatile and non-volatile memory for persistently and/or temporarily storing information. The data store 224 can log historical data, trend data, in situ data, buffered data, programmatic information, schemas, relational databases, address books, look-up table, style sheets (e.g., XML-based), rules (e.g., expert rules), non-linear trained learning systems, etc, in connection with effecting notification services in accordance with the subject invention.

An artificial intelligence (AI) component 270 can provide for performing inference-based decision making in accordance with notification conveyance in accordance with the invention. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Moreover, the AI component 270 can perform utility-based analyses in connection with determining if, when, to whom or what, and in what manner to convey notifications. The cost associated with sending the notification (e.g., processing overhead, bandwidth, disruptive/interruptive aspects toward the receiving entity . . . ) can be weighed against the benefits associated with the conveying the notification. Also, the costs associated with making an incorrect decision can be weighed as a factor, and such can be offset with confidence measures and thresholds.

Figure 3:
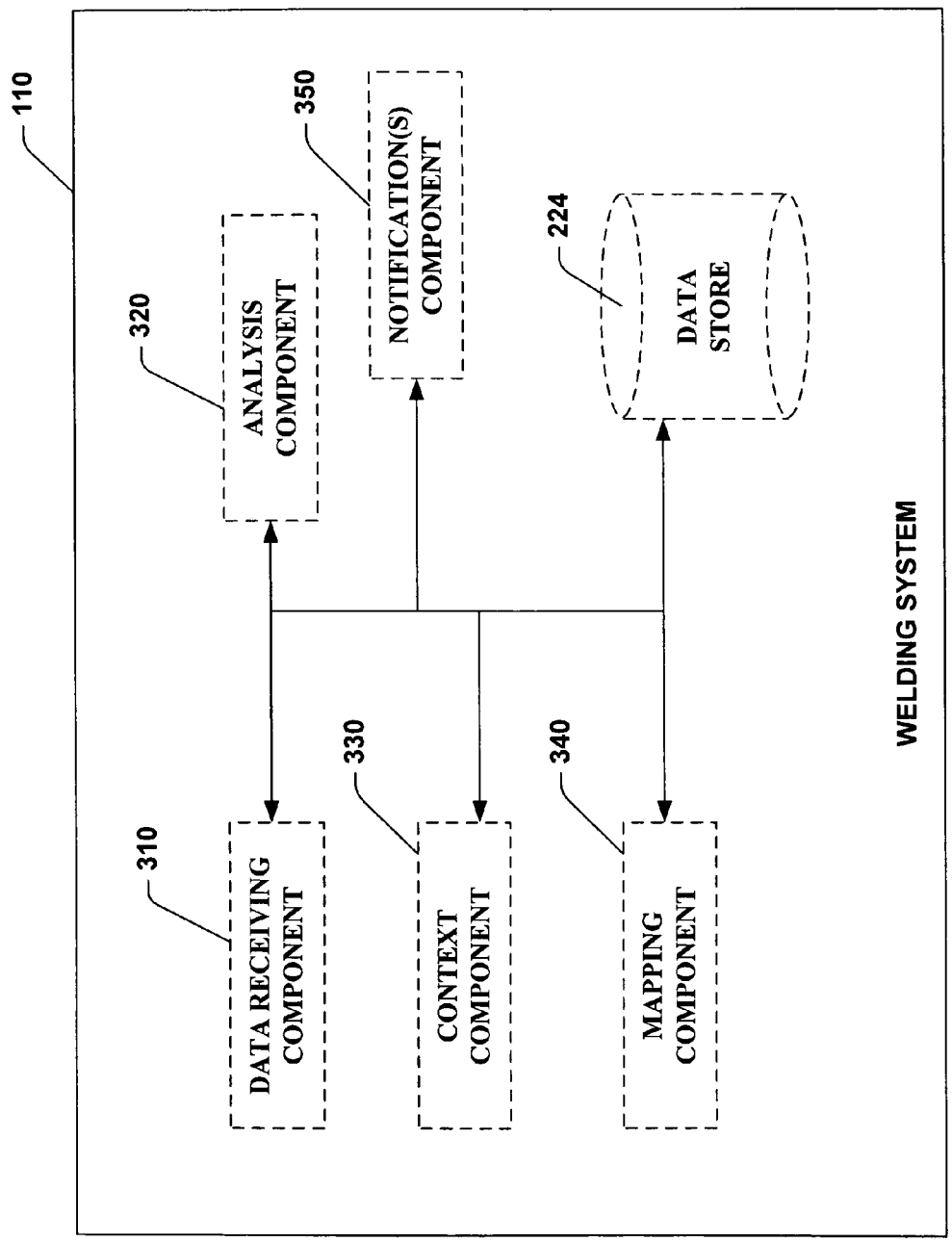
FIG. 3 is a schematic block diagram illustrating exemplary welding system components in accordance with an aspect of the invention.

FIG. 3 depicts other components that can be employed by the welding notification system 110 in accordance with the subject invention. A data receiving component 310 receives information relating to the welding system 110. The information can pertain to a variety of types of data (e.g., performance of a welder, performance of a cluster of welders, diagnostic information, operation information (voltage, current, power . . . ), component information (hardware, software, devices, mechanical and/or electrical components, trend information, output information, pressure, temperature, noise, welding electrode status, machine status, line status, factory status, context, time, day, month, year, vibration information, voltage signatures, current signatures, connections, device failure, system faults, overload conditions, under-load conditions, safety-related information, idle-related information, diagnostic information, prognostic information, state information, environment information, operator information, product information, quality assurance information, enterprise resource planning (ERP) information, just-in-time (JIT) information, operating system information, processor information, memory-related information, relational database information, web-based information, notification information, web-based information, response information, system events, common events, uncommon events, weld faults, wire spool status, bad trend, status report, weld history . . . ).

An analysis component 320 analyzes the received information in connection with making notification-related determinations/inferences. A context component 330 facilitates providing additional meaning and/or interpretation of the received information so that the analysis component 320 can make desirable notification decisions. A mapping component 340 facilitates identifying appropriate entities that should be sent notifications in connection with certain events. The mapping component 340 coupled with the context component 330, notification component 350 and the analysis component 320 provides for a highly efficient system for determining and/or inferring best most appropriate entities to convey notifications to as well as via most suitable channels/modes of communications (e.g., wireless, Internet, e-mail, land-line, audio, satellite, RF . . . ) as well as modalities (e.g., PDA, television, cellular telephone, pager, desktop computer, laptop computer, telephone, video phone, car phone, intercom) as well as time, recurrence, day for effecting the notification. Moreover, the system can take into consideration state information such as location of recipients, availability of recipients, urgency of the event, priority of the event, consequence of not taking action in connection with the event, etc.

Figure 4A:
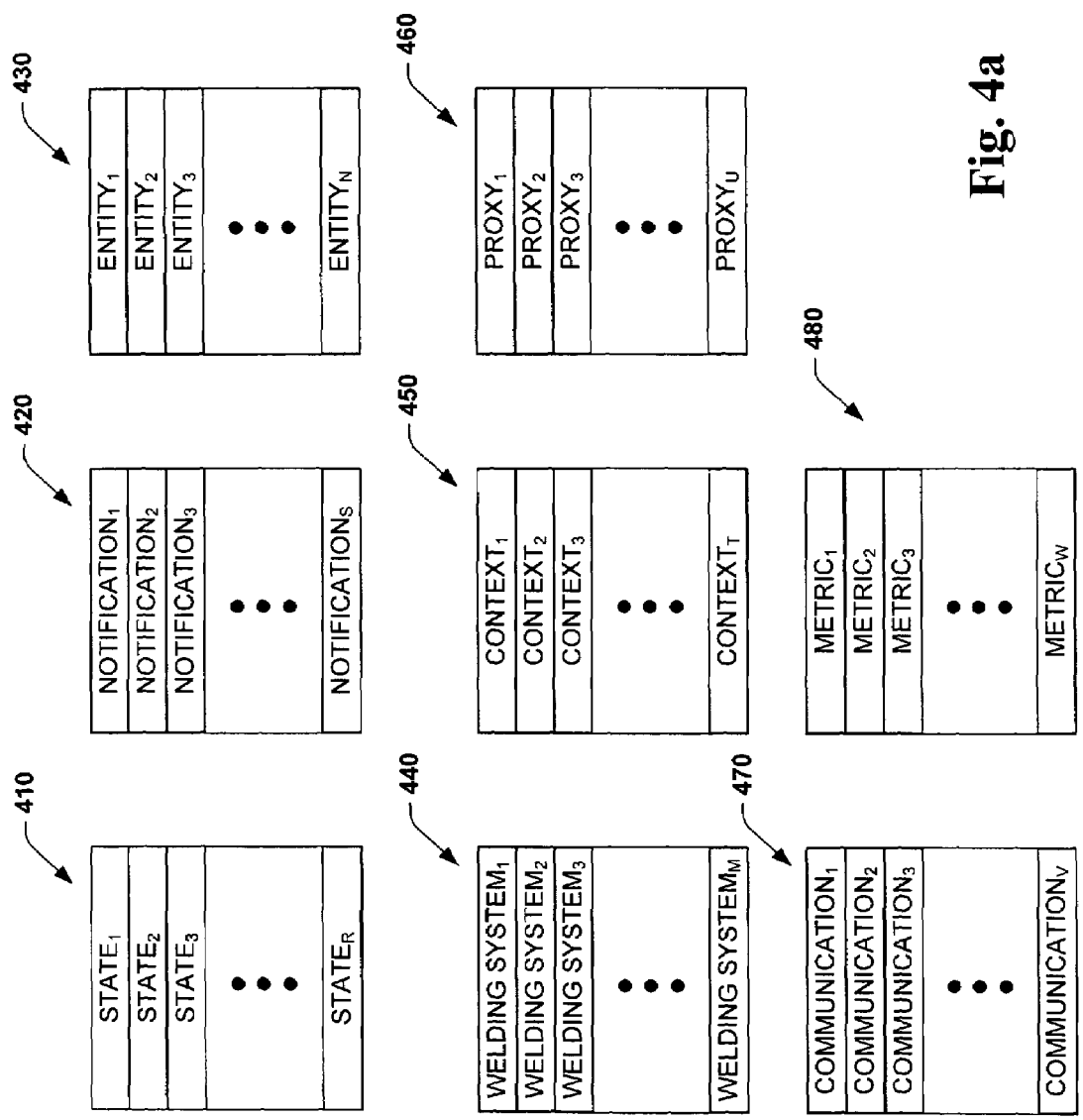
FIG. 4a illustrates a plurality of data types that can be employed in connection with the subject invention.
Figure 4B:
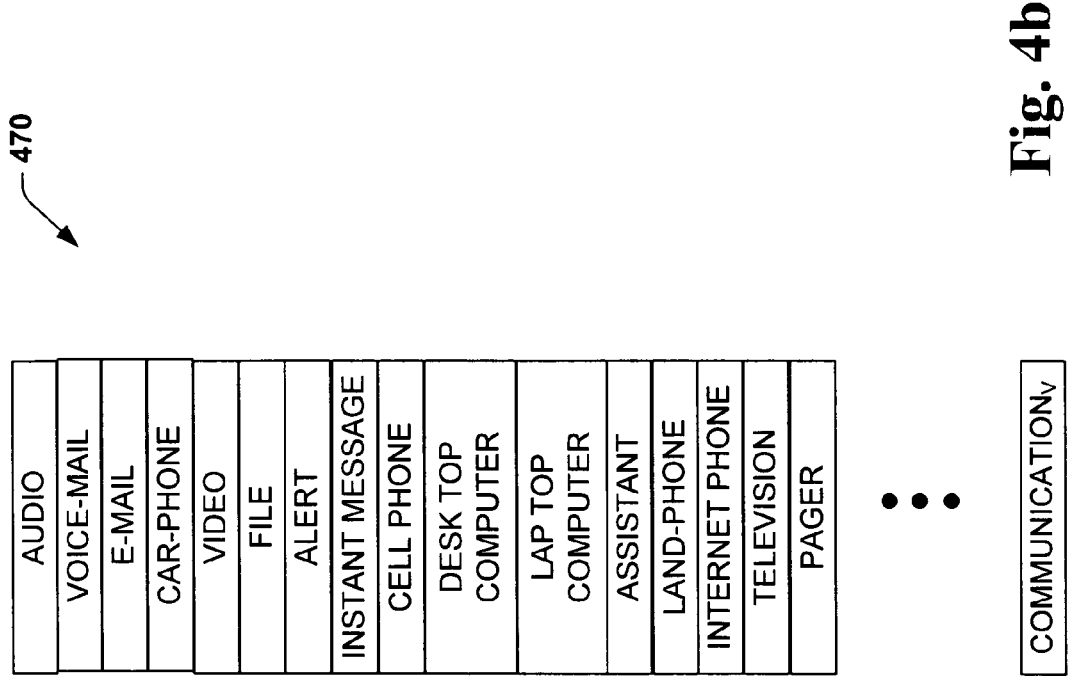
FIG. 4b illustrates a plurality of data types relating to communication modes and modalities in accordance with the invention.

FIG. 4a depicts various types of information that the notification system 100 of the invention can employ. For example, state information 410 (e.g., state of welder, state of system 110, state of recipient, state of extrinsic devices, systems and/or conditions . . . ), notification information 420 (e.g., notification format, type of notification, urgency, priority . . . ), entity information 430 (e.g., entity state(s), entity preferences, availability, location, interruptibility, available devices, device preferences . . . ), welding system information 440 (e.g., performance, throughput, quality, load, maintenance, welding conditions, weld quality, condition of parts, hardware, software . . . ), context information 450 (e.g., context for the event), proxy information 460, communication information 470 (e.g., available communication modes, devices, . . . ), and other suitable metrics 480. FIG. 4b lists various communication related data fields that may be employed/considered in connection with notifications in accordance with the invention.

EXAMPLE IMPLEMENTATION

One particular example of a simple system in accordance with the invention is now provided. It is to be appreciated that this example is merely one specific manner in which to practice the invention, and the subject invention as defined by the hereto appended claims is not intended to be limited to this exemplary embodiment. The system 100 can notify entities by employing a configurable address book that is used to generate e-mail when certain events occur in the welding system 110. The system 110 includes a welder with a configurable address book that is attached to an SMTP mail server through an Ethernet network. The welder monitors itself and the welding system for certain events. When one of these events is detected, the welder will search its address book for any recipients that want to be notified when this event occurs. The address book contains configuration information associated with each address for determining which recipients to notified. If it finds one or more recipients to notify, it will then build up e-mail. The subject and body of each e-mail are determined by the event that was detected. This e-mail is then sent to the SMTP Mail server that is located on a network that the welder is attached to.

It is to be appreciated that respective entries in the address book can contain information such as e-mail addresses, configuration information for determining when to send a recipient an e-mail, interruptibility and non-interruptibility information regarding the recipient, available communication devices and/or systems, break-through privileges . . . . In one specific implementation, each address entry can be configurable except for a first entry, which is set to a special support e-mail address that cannot be changed. This address book is preferably stored in non-volatile memory so it is saved when power is disconnected from the welder or the system reset is reset.

Regarding events, the system 100 monitors for certain pre-defined as well as anomalous events. The events can be categorized into different groups—each address in the address book, except for the first address, than can be configured to specify which event group to receive e-mails for when an event for that group occurs. If one of these events occurs, the welder can associate a time-stamped with it. When the system 100 detects an event that it is monitoring for, it will search its address book looking for recipients that want to be notified about this event group. If it finds one or more recipients to notify for this event group, it will build up an e-mail message. The subject and body of the e-mail message are determined by the event that was detected. The subject can start with a predefined string that can be used by the recipients to separate these e-mails from other e-mail the recipients might receive. The e-mail body can contain a timestamp from when the event was detected by the welder. The e-mail body includes information that identifies which welder the e-mail is from—this information is configurable and can be persisted in non-volatile memory.

The different event groups can include the following, for example:

| Event | Description |
| --- | --- |
| System Errors | These are generated when the welding system detects a serious problem. |
| System Change Events | This is for when a new board is detected; a board that was detected that last time the system was checked is now missing, or when any firmware in the welding system has changed. |
| Common Events | These are generated when a less serious problem or alarm is detected or when a condition occurred that has caused the welder to stop welding or prevent it from welding. |
| Un-Common Events | These are for less serious problems or alarms. Most of these deal with the internal communications of the welding system and usually does not prevent the welding system from operating. |
| Weld Fault | This is generated by when a weld is detected to be out of limits. |
| Change Wire Spool | This is generated when the welding system determines that the wire spool is running low on wire. |
| Bad Trend | This is generated when the welding system sees a number of "bad" welds over a certain number of welds. |
| Status Report | This event is generated by the welding system based on the time of day. When a certain time is reached, the welding system will generate a "status report" event. |
| Data History | After every weld, an event is generated, then after every "Nth" weld, a data history report is generated. This report contains weld information on each weld that was taken since the last data history report was generated. |

The e-mail body can include company name and company address information, and include additional information about the event that occurred. It is to be appreciated that the e-mail body can be a straight text message or it can include file attachment(s). The file attachment(s) can be in different formats such as text, binary, or comma delimited, JPEG, PDF, BMP . . . The file attachments can be sent for example using Multipurpose Internet Mail Extensions (MIME), as described in RFC1341. The e-mail can be sent to a SMTP server over a network using Simple Mail Transfer Protocol (SMTP), as described in RFC821, for example. Preferably, one e-mail is generated for each respective event, even if there are multiple recipients. The system 100 can add multiple recipients to the "RCPT To:" field in the e-mail message that is sent to the SMTP server.

Besides the welder monitoring the system 100, for certain events can perform a self-check after a period of time (e.g., after powers up or is reset). This self-check looks for things that might have changed since a last self-check was performed. This includes items such as new boards in the welder, software changes in the welder, and any changes in the system that were not logged using the normal event notification process. Also, the system 100 can send test e-mail message(s) to each of the addresses. This is for diagnostics in order to confirm that configurations and connections are correct. The system 100 can keep track of how many e-mails it has sent out since the last time it was reset.

| Item | Description |
| --- | --- |
| DNS IP | This is the IP address of the local Domain Name Server. |
| SMTP Name | The Name of the Simple Mail Transfer Protocol Mail Server. |
| SMTP IP | The IP address of the Simple Mail Transfer Protocol Mail Server. |
| SMTP Port | This is the TCP port the welder will send mail to. |
| From E-Mail Address | This is the E-Mail address the welder will use for sending out mail. Ex: sender123@yourcompany.com. Make sure this is in a valid email format. |
| E-Mail Machine number Name | This is a string that is automatically embedded in the e-mail message that is used to identify which machine the E-mail came from. This should be a unique string that is used to identify which machine the E-mail came from. In the message section of the e-mail, the text will always start with a "From:" followed by what is inputted for this string. Examples for this could be something like "Plant A, Column F, Row 1", "Muffler Line, Welder 1", "Machine number 1234", etc. |
| Company Identifier | This string is automatically embedded in the e-mail message and is used to identify what company the E-mail came from. In the body section of the e-mail, the text will always start with a, "From:", followed by the what is inputted for the E-Mail Machine number Name, and then followed by what is inputted for this string. If this string is not set, then the E-mailer in the welder will not send an E-mail to the first E-mail address which is the fixed support address for Company A. An example item to for this string would be - "Company A, Cleveland OH". |
| Report Status Time Settings | These define the times when the welding system will generate a status report. |
| Trend Settings | This defines the criteria for generating a bad trend event. |

On startup, if the DNS IP and the SMTP Name are set, the system can try to query a DNS Server with the SMTP Name for the IP address of the SMTP Mail server. If the query was successful, the E-Mail task will then use the returned IP address to send E-mail to, else it will use the IP address specified by the SMTP IP setting. When the welding system is powered up, its starts to continuously monitor the welding system for events then on. Also besides continuously monitoring the welding system, the welder can perform special processing at a predetermined interval after it is started. This processing is a self check that includes checking the system for any new boards, any boards that were there the last time the welding system was checked but are not there now, and it checks if any boards, including itself, contain any different software. If it finds any of these conditions, it will then search the address book for any addresses that want to be notified of a system change event, and then generate e-mail to them. The system waits a predetermined period before checking for any System Change items in order to give the system time to settle down. If this check was done right after a reset, the system could be in the process of being reprogrammed which might generate "false" events.

When an event occurs, the welder can associate a time-stamped with it. These events are then placed in a queue for processing by the welder. So if the welder is currently in the process of sending out e-mail when a new event occurs, it will not "miss" this event and will process the new event as soon as it is done with the event it is currently processing. When the welder gets in a new event, it will then determine what event group the event is for. It will then search its address book for all recipients that want to receive an e-mail for this particular event group. If it finds one or more addresses that have their event group setting setup for this event, the welder will then generate e-mail to that person or persons.

The subject and body of the e-mail message can be determined by the event that was detected. Each type of event can generate a different subject and body for the e-mail. The subject can start with the predefined string, "Machine number Mail-", followed by text describing the type of event. This predefined string helps recipients in separating the e-mails from the welders from other e-mail the recipients might receive.

The body of the e-mail preferably starts always with a "From" field to help identify which particular welder the mail came and which company the welder is located at. The welder can automatically embed the string that is inputted in the "E-Mail Machine number Name" field after the "From" text. After the Machine number Name, the welder will automatically append the information that inputted in the "Company Identifier" field. While this string is not really necessary for persons working at the location where the welder is located, it may be needed by others to identify where the e-mail came from. If the "Company Identifier" string is not set, then the welder will not send any e-mails to the first address entry in the address book. This first address entry is for the fixed company support address. The e-mail body can contain the timestamp from when the event was detected by the welder. This time stamp is from when the event actually occurred in the welding system, this is not to be confused with the time that the e-mail body was generated or when the e-mail was sent out which can be different. The body of the e-mail also usually contains additional details about the event. The e-mail body can be just a straight text message or it can even include a file attachment. This file attachment can be in different formats such as text, binary, or comma delimited. File attachments are sent using Multipurpose Internet Mail Extensions (MIME), as described in RFC1341. Whether the e-mail body is just a text message or contains a file attachment is determined by the event. The e-mail can be sent to a SMTP server over a network using the Simple Mail Transfer Protocol (SMTP), as described in RFC821.

Figure 4C:
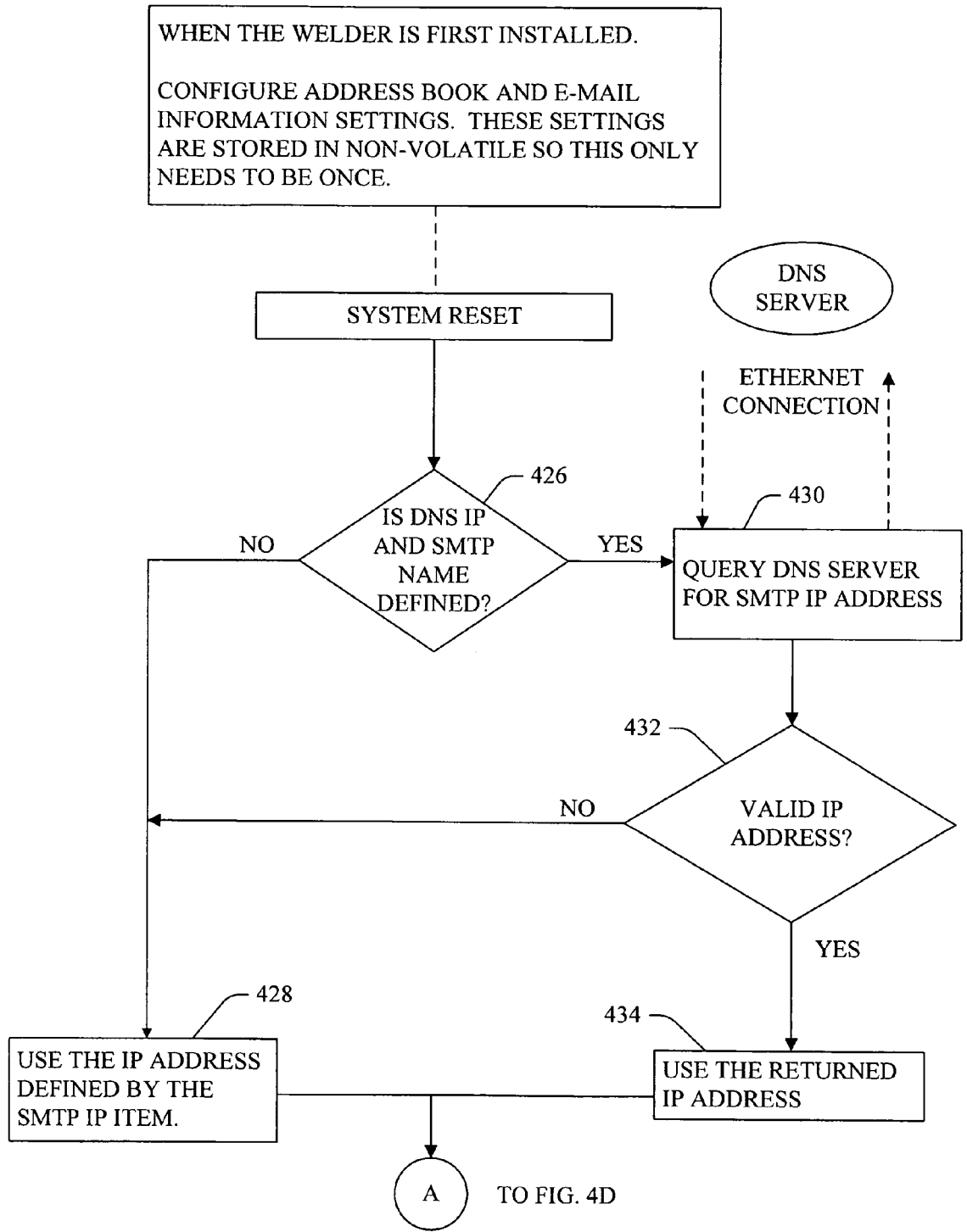
FIGS. 4c-4e illustrate exemplary systems and processes for generating welding notifications in accordance with the invention.
Figure 4D:
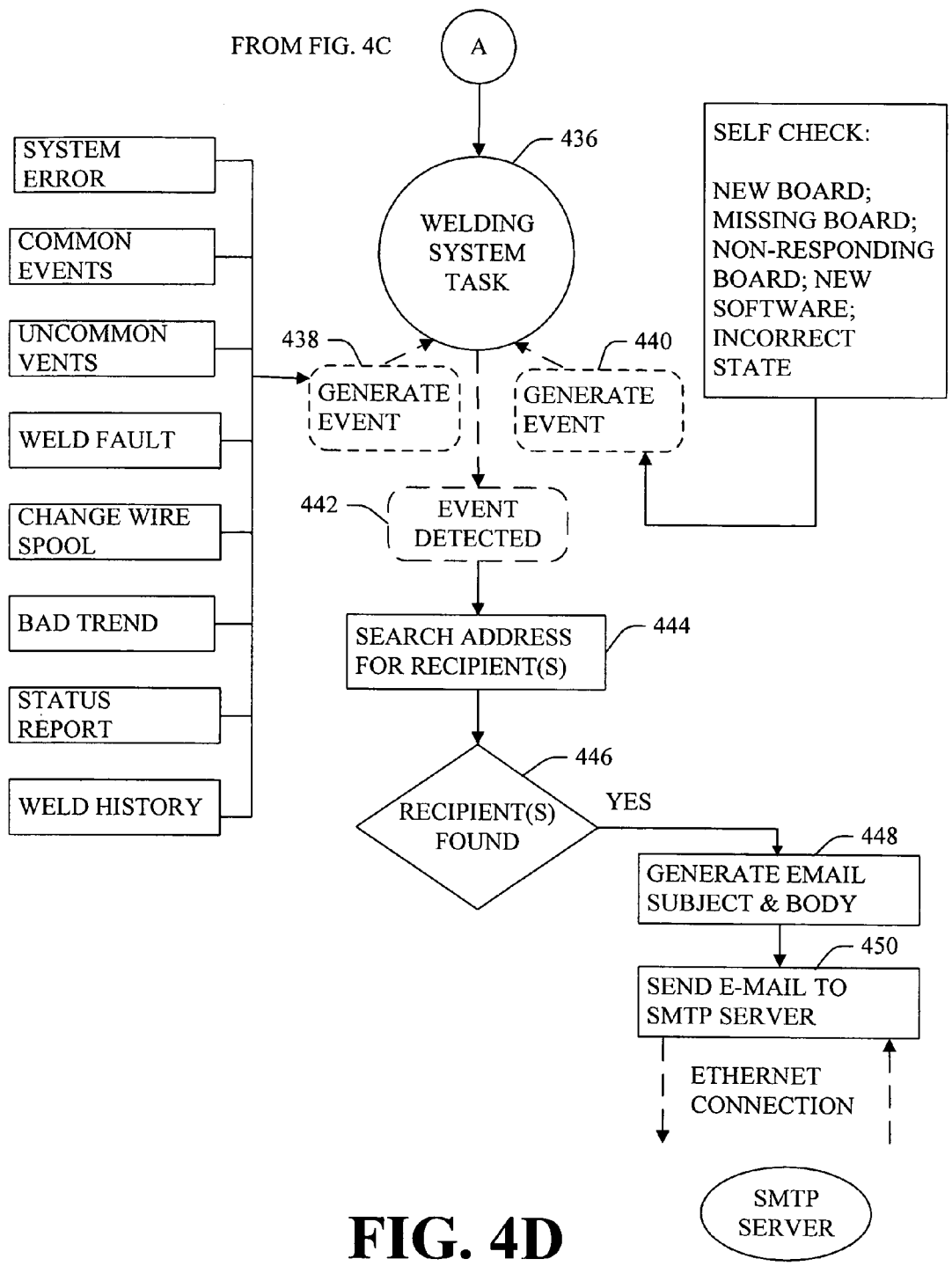

FIGS. 4c and 4d illustrate an exemplary flow diagram for the welding system 100. It is to be appreciated that when the welding system 110 is installed, a respective configuration can be generated. Such configuration can comprise at least recipient email addresses (e.g., stored within an address book), email information settings and/or information utilized to facilitate determining whether a recipient should receive an email. This information typically is stored in non-volatile memory (e.g., PROM and variants thereof, hard disk, optical disk, portable memory, CD, DVD, . . . ) such that it generally only needs to be stored once. However, in some aspects of the invention, the information can additionally or alternatively be stored in volatile memory. Upon creating the configuration, the welding system 110 is reset in order to load the configuration.

At 426, it is determined whether a DNS IP and SMTP name is defined for the welding system 110. If not, at 428 an IP address is determined by an SMTP IP item. If the name is defined, at 430 an associated DNS server is queried (e.g., over Ethernet) for the SMTP IP. At reference numeral 432, it is determined whether a valid IP address for the SMTP server has been returned. It is noted that failure to return an IP address can be considered a return of an invalid IP address. If it is determined that an invalid IP address has been returned, then at 428 the IP address is determined by the SMTP IP item. Otherwise, at reference numeral 434 the returned IP address is utilized.

Continuing with FIG. 4*d*, at reference numeral 436, the IP address (defined by the SMTP item or the server) is utilized to transmit email to recipients, based on received events. As noted previously, the welder 110 can perform self-monitoring for events. At reference numeral 438, an event is generated in response to at least one of a system error, common events, uncommon events, a weld fault, a change wire spool, a bad trend, a status report, and a weld history, for example. At reference numeral 440, an event is generated in response to a self check that can include periodic monitoring for new boards, missing boards, non-responding boards, new software, software in an incorrect state, . . . At 442, one or more events generated at 438 and/or 440 are detected. When at least one such event is detected by the welder 110, then at 444, the welder can search its address book for a recipient(s) to notify. As noted above, the address book includes email addresses and/or configuration information associated with respective addresses for determining which recipients to notify. At reference numeral 446, if one or more recipients are located, an e-mail can be generated, wherein at 448 the subject and body of the e-mail can be determined by the event that was detected. At 450, this e-mail can be sent to an associated SMTP server.

Figure 4E:
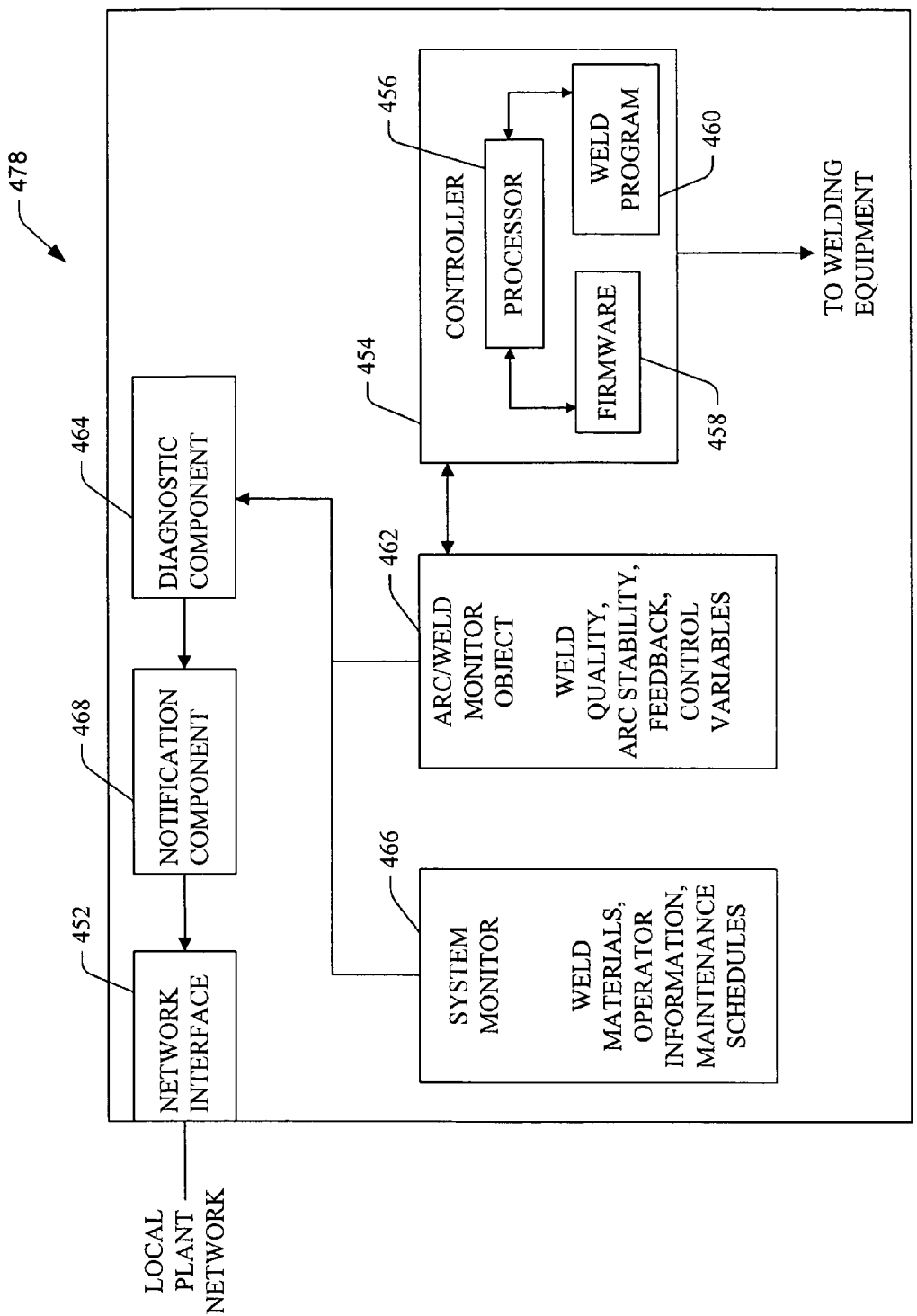

FIG. 4*e* illustrates an exemplary architecture 478 that can be employed with the welding system 110. Based on the architecture 478, the welding system 110 includes a network interface 452 that communicates with a local plant network (or remote network such as the Internet) in order to transmit and/or receive information such as notifications and/or email. The network interface 452 can employ various network protocols such as HTTP, FTP, SMPT, . . . .

The system 110 further includes a controller 454 that communicates with welding equipment, for example, to provide control information. The controller includes, inter alia, a processor 456, a firmware 458 and a memory 460 that stores one or more weld instructions (e.g., within a routine or program). As depicted, the processor 456 can read and/or write information to the firmware 458 and/or memory 460. For example, the processor 456 can retrieve instructions from the firmware 458 and/or memory and execute the instructions.

The controller 454 further communicates with an arc/weld monitor object 462, which can be utilized to determine weld characteristics and properties such as weld quality, weld quantity, arc stability, temperature, and performance, for example. The monitor object 462 can also be provided rules, policies or threshold values wherein if the data variables are above or below a predetermined threshold, the monitor object 462 is alerted and may then take further actions, such as notifying the diagnostic component 464, an operator, and/or other remote system. The monitor object 462 can also monitor various power properties such as waveforms supplied to the electrode, movements or travel of the welding tip during welding and other aspects to monitor the quality of the weld. Additionally, the monitor object 462 can be provided with knowledge to monitor the current conditions, such as comparing certain values to expected values or logic details to determine current state of the weld characteristics and properties, for example. Such information can be logged, analyzed and utilized to generate feedback, parameters and control variables. These characteristics and properties and the resultant information can be utilized by a diagnostic component 464 to determine alarm conditions and generate events. In addition, information associated with a system monitor 466 such as weld materials, operator information, maintenance schedule can be provided to the diagnostic component 464 to facilitate determining alarm conditions and generating events. Moreover, the monitor object 462 and/or the system monitor 466 can generated alarms and/or events and convey this information to the diagnostic component 464.

When the diagnostic component 464 detects an alarm condition or event and/or initiates an alarm or event, a welding system address book can be scrutinized to locate recipients to notify of such alarms and/or events. The address book typically is configurable and includes information such as email addresses, email settings and/or data that can facilitate determining recipients to notify. The diagnostic component 464 can invoke the notification component 468, which can generate an email, wherein an associated subject and body are determined by the alarm or event and/or the source of the alarm of event. The notification component 468 can transmit the email to the recipient(s) over the local plant network via the network interface 452.

Figure 5:
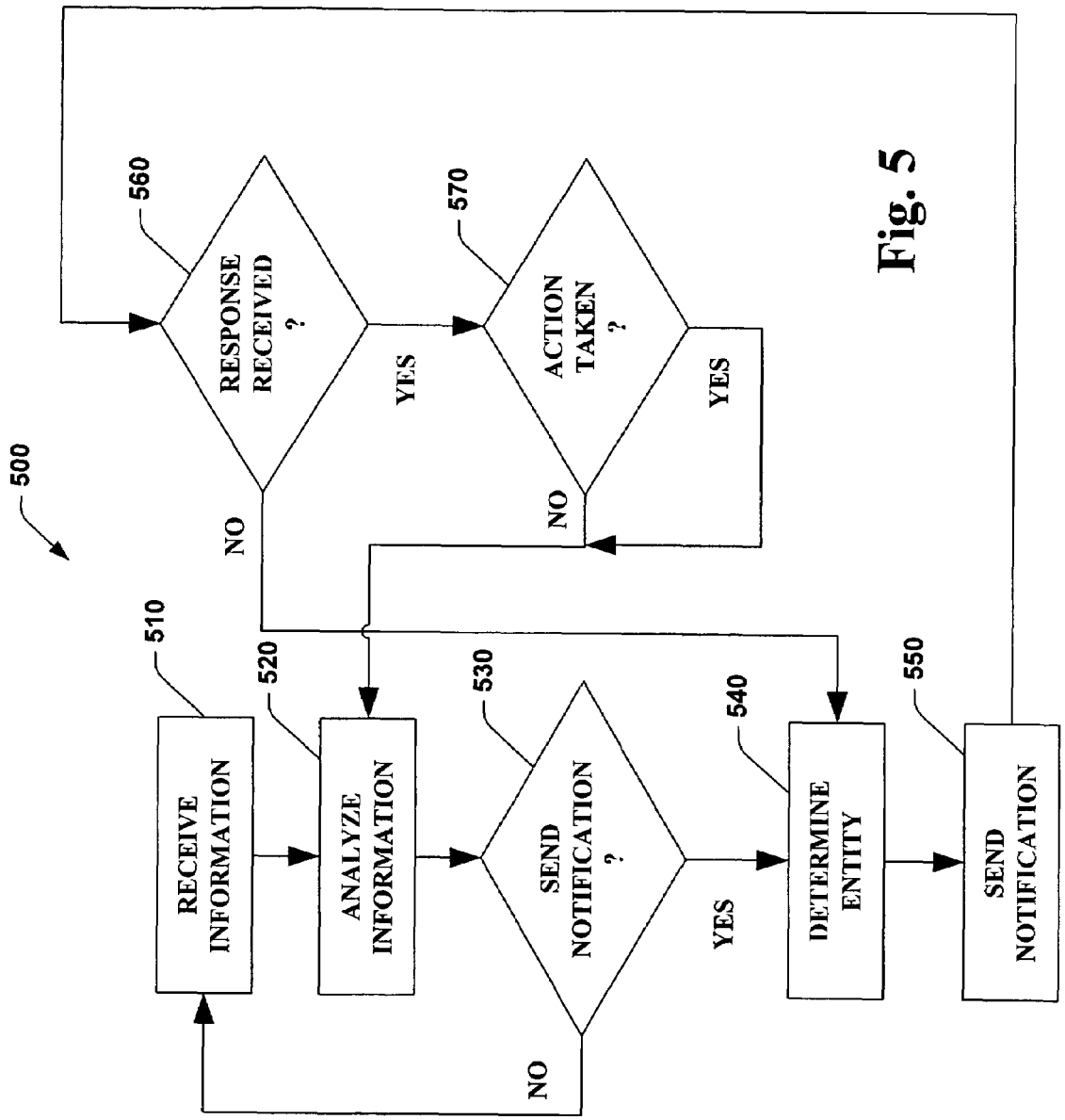
FIG. 5 is a flow chart diagram illustrating an exemplary notification methodology in accordance with the invention.
Figure 6:
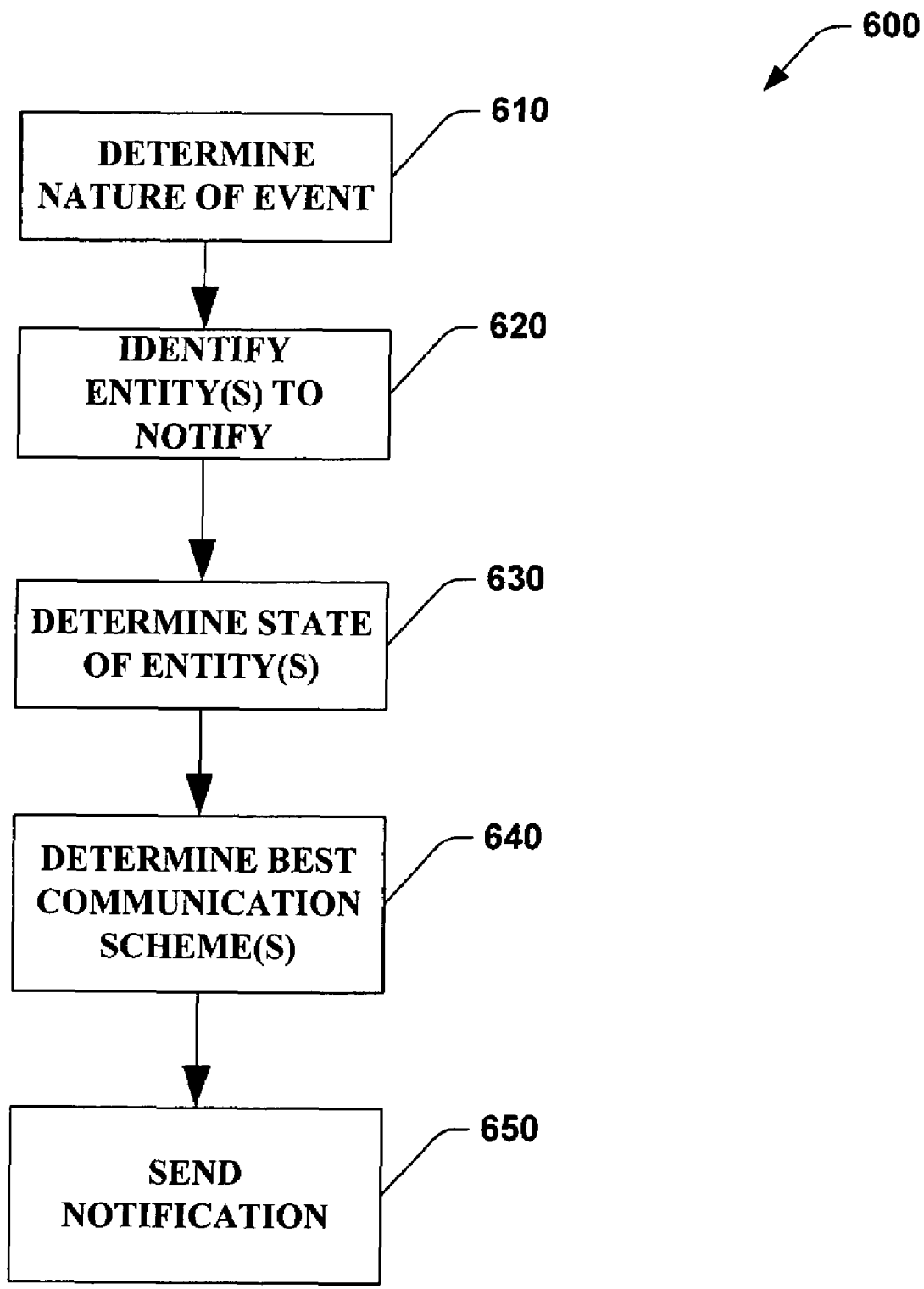
FIG. 6 is a flow chart diagram illustrating an exemplary notification methodology in accordance with the invention.
Figure 7:
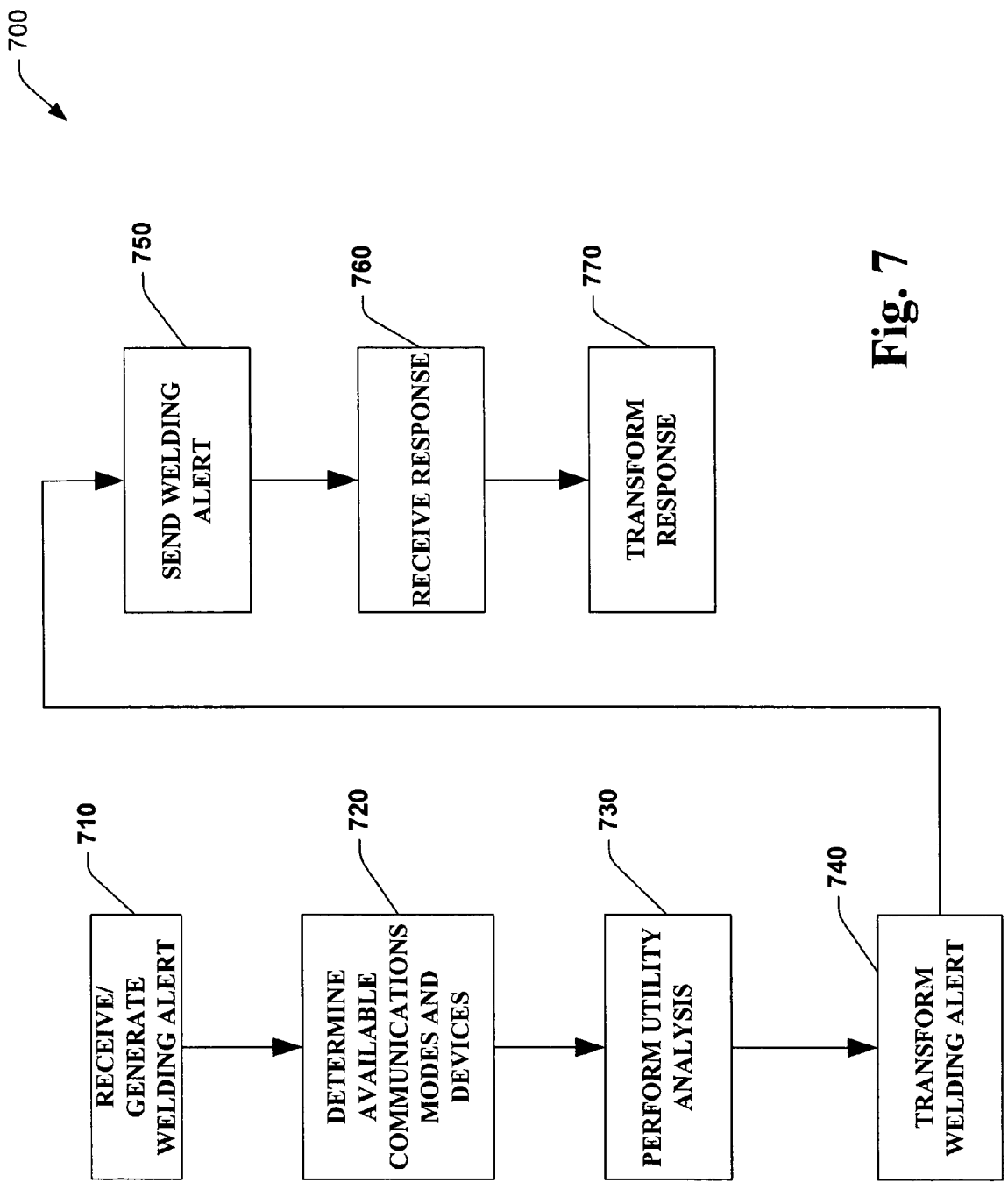
FIG. 7 is a flow chart diagram illustrating an exemplary notification transformation methodology in accordance with the invention.

FIGS. 5-7 described below, illustrate methodologies for providing various aspects of a welding notification in accordance with the invention. While, for purposes of simplicity of explanation, the methodology is shown and described as a series of acts, it is to be understood and appreciated that the invention is not limited by the number or order of acts, as some acts may, in accordance with the invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the invention.

FIG. 5 illustrates a high-level methodology 500 for conveying notifications in accordance with the invention. At 510, information related to a welding system/process is received. At 520, the information is analyzed in connection with generating and/or conveying a notification related to event(s) associated with the received information. At 530, a determination is made in connection with whether or not the event warrants generating and sending a notification related thereto. If no, the process returns to 510—if yes, the process proceeds to 540 where suitable entities to convey the notification to are determined and/or inferred. At 550, notification(s) are conveyed to the entities via suitable communications modes and modalities. At 560, a determination is made as to whether or not a response to the notification was received from the entity. If no, the process returns to 540 where another suitable entity is selected (e.g., a proxy for the initial recipient). If yes, the process proceeds to 570 where a determination is made as to whether or not suitable action was taken in connection with the event. If no or yes, the process returns to 520, wherein the action-related determination information is analyzed in connection with the event.

FIG. 6 illustrates a methodology 600 in connection with conveying notifications in connection with an aspect of the invention. At 610, nature of an event is determined. At 620, entities most suitable to receive information as well as respond to such information in connection with the event are determined. At 630, state of the entities is determined and/or inferred. At 640, best manner in which to convey the notification is determined and/or inferred. At 650, the notifications are sent to the selected entities via the most suitable modes and modalities of communication available.

FIG. 7 illustrates a methodology 700 for transforming and conveying notifications in accordance with the invention. An alert relating to a welding event is received at 710. The alert is analyzed and at 720 best modes for communication to the alert are determined and/or inferred. At 730, a utility-based analysis is performed in connection with determining and/or inferring best manner in which to convey the alert. At 740, the alert is transformed to a format coincident with the determined best modes and modality for conveying the alert. For example, the alert can be transformed from text to an audio file to be sent to a car phone that an identified recipient is currently driving—sending text to the recipient while driving would be dangerous, and thus audio was determined to be the best mode for delivery and the car phone the best modality for conveying the alert. At 750, the alert is sent as transformed. At 760, a response is received from the recipient in response to the notified alert, and at 770, the response is transformed to a most suitable form for processing thereof.

Figure 8:
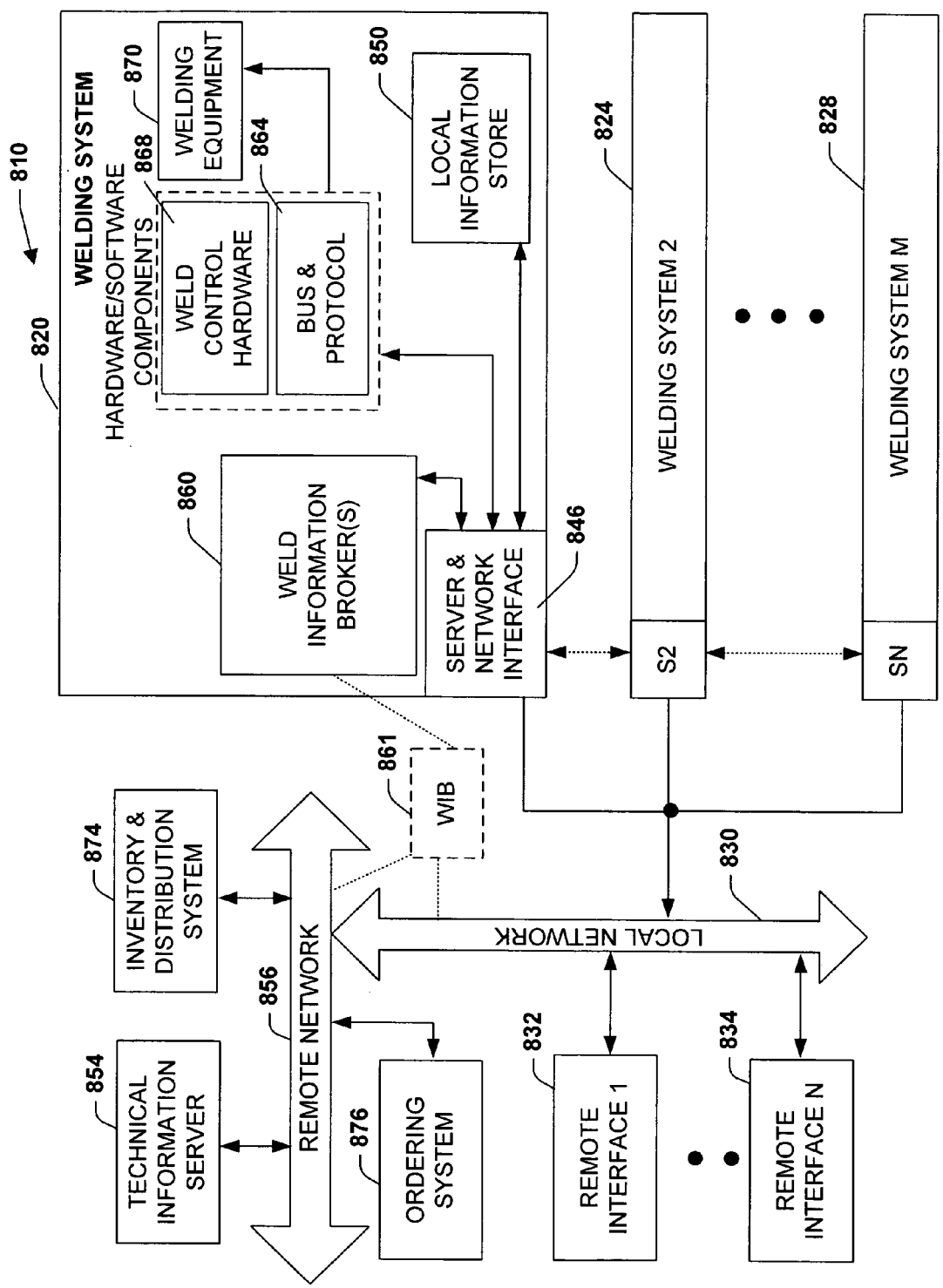
FIG. 8 illustrates an exemplary automated welding system notification architecture in accordance with an aspect of the invention.

Referring to FIG. 8, a system 810 illustrates an exemplary automated welding system notification architecture in accordance with an aspect of the invention. The system 810 includes a welding system 820, one or more other welding systems, depicted as welding system 824, and welding system M 828, M being an integer, that are operatively coupled via a local network 830. One or more remote interfaces 832 and 834 (e.g., web browser) interact with the welding systems 820-828 across the network 830 and enables a welding operator or user to service, maintain and/or update the welding systems. Welding notifications can be communicated from the welding system 820 to the remote interfaces 832,834 by a server and network interface 846 and may include a web server that opens network sockets (not shown) to transmit the notification information. The welding notification information may be provided from a local information store 850 (e.g., database) and/or from a technical information server 854 that resides on a remote network 856 such as the Internet. It is noted that the local information store 850 can reside within the welding systems 820-828 and/or reside as a separate entity on the local network 830. The local network 830 may be connected to the remote network 856 via a Local Area Network (LAN) bridge connection (not shown), however, it is to be appreciated that a single network may service the system 810.

In accordance with one aspect of the invention, one or more welding information brokers 860 are employed to facilitate retrieval of recent welding information at the remote interfaces 832 and 834. The welding information broker 860, which can be a component and/or object and executed/instantiated by the server and network interface 846 and/or can operate as a separate entity 861 (e.g., local or remote computer) on the local network 830 or remote network 856, interrogates a local bus 864 to determine the particular hardware components and/or software that define the welding system 820. These components may include weld control hardware 868 that controls associated welding equipment 870, wherein the welding equipment 870 is the physical hardware producing the weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source (not shown). The weld control hardware 868 may include a weld controller (not shown), an arc/weld monitor (not shown), and weld I/O and communications interface (not shown) to control the welding equipment 870. The local bus 864 provides component version information, such as a revision number or code, to indicate the particular components that are included in the welding system 820. When welding information is requested by or sent to the remote interfaces 832 or 834, the welding information broker 860 and/or 861 is linked (e.g., associated with a domain name of a website containing welder information) to the technical information server 854 to determine welding information that is applicable to the welding system 820.

An ordering system 876 (e.g., remote server) linked to the welding information broker 860 provides purchase history and related information for the welding system 820. The ordering system 876 includes information relating to an entity that purchased the welding system 820, billing and shipping addresses for the entity, and credit information concerning account status and warranty information associated with the welding system 820 and the entity. For example, if a replacement component is under warranty, a flag may be set within the ordering system 876 indicating that no charge is to be accessed relating to the replacement component. The ordering system 876 and the information contained therein enables automatic acquisition of the selected replacement component by linking the entity's billing, shipping and warranty information with the welding information broker 860, thus mitigating manual purchase order generation and negotiations involved with conventional welding systems.

Figure 9:
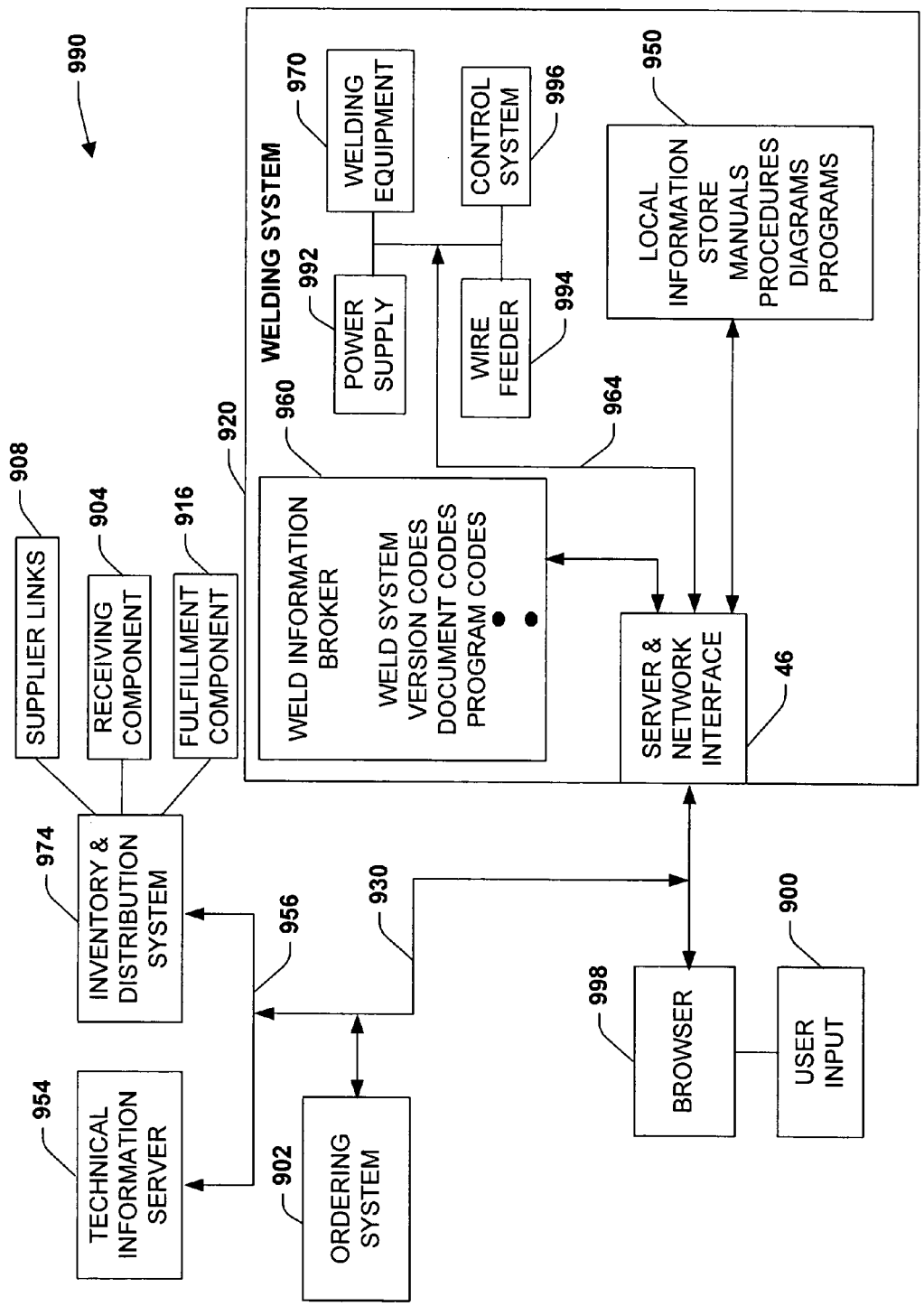
FIG. 9 illustrates an exemplary welding network information and part acquisition system in accordance with the subject invention.

Referring now to FIG. 9, a system 990 illustrates an exemplary welding network information and part acquisition system in accordance with the present invention. The system 990 includes the welding information broker 960 that can access/retrieve information via the local welding system bus 964. The local bus 964 may include a Controller Area Network (CAN) employing Arc Links or other protocols, for example, that communicates to welding system components such as a power supply 992, a wire feeder 994, a control system 996 and the welding equipment 970. The information received from the welding system components may include manufacturing history information or codes, machine type codes, model and serial numbers or codes, and/or software and hardware version numbers or codes. It is to be appreciated that other descriptive information or codes may be received from the welding system components 970, 992-996 and/or other welding components (not shown). After the welding information broker 960 is updated, links are established with the technical information server 954 (e.g., connect to a predetermined URL).

The welding information broker 960 is updated/compared with the technical information server 954 to reflect the latest information version levels relating to the welding components on the local bus 964 or other components within the welding system 920. The broker then compares the document version levels with document version levels that are stored locally at the local information store 950. If the latest document version is available locally, a browser 998 is served with the local welding information from the local information store 950. As described above, if the local information is at an older or lower version level, the welding information broker 960 initiates a download after verification of the version levels (e.g., requesting particular information or programs at more recent revision level) from the technical information server 954 or provides the welding operator an option to view the documents or programs remotely from the browser 998. As described above, it is to be appreciated that local information store 950 and/or the welding information broker 960 can be executed within the welding system 920 and/or as a separate entity operatively coupled to the welding system.

When the most recent welding information has been located and provided to the browser 998, the welding operator/user may proceed to service, operate, and/or troubleshoot the welding system 920 from the retrieved information. This may include following procedures or diagrams that indicate potential replacement components within the welding system 920. Additionally, the welding system may need to adapt to a different type of welding process. Thus, the operator or user may automatically initiate a purchase and subsequent download of a suitable welder program or procedure to re-configure the welding system 920. A user input 900 such as a mouse, keyboard, touch screen or other suitable device enables the welding operator to select a desired replacement component or procedure. If a component/procedure is selected for replacement, a component number or code associated with the component/procedure is linked the remote inventory and distribution system (IDS) 974 via the broker 960. The IDS 974 that may include information such as bill of material and supplier information (e.g., Enterprise Resource Planning system) interacts with the welding information broker 960 and determines a suitable replacement part via a receiving component 904. This may include querying an ordering component 902 and supplier parts database (e.g., service or spare parts) and/or network 908 for relevant purchasing information. The purchasing information may include, supplier names and addresses, price, availability, delivery terms, payment terms and/or other information relating to acquiring a replacement component. The purchasing information may also include billing, shipping, address, order history and warranty information/status associated with a purchaser/owner of the welding system 920.

The receiving component 904 provides the welding information broker 960 with the purchasing information and notifies (e.g., flag, e-mail) the broker that purchasing information related to the selected component or procedure from the browser 998 is available. The welding information broker 960 then invokes the ordering system 902 to generate an electronic purchase order utilizing the purchasing information within the broker. For example, the ordering system 902 may access the selected part number within the broker 960, update (e.g., output part/supplier/purchaser data to a file) an electronic purchase order with supplier address, price, terms and shipping information that includes the address of the owner of the welding system 920. The ordering system 902 then submits a completed purchase order to a fulfillment component 916 associated with the IDS 974. The fulfillment component 916 inputs/reads the purchase order, determines whether any warranty or other actions apply to the purchase order, and transmits the purchase order to the replacement part supplier (e.g., e-mail, on-line service). Notice may also be sent to the welding operator indicating that an order has been placed and when delivery is expected. It is noted that automatic replacement part or welder procedure ordering is initiated at the user input level, such as from the browser 998 and can be from a single user action such as a keystroke or mouse click within an associated technical manual or document viewable on the browser 998.

Figure 10:
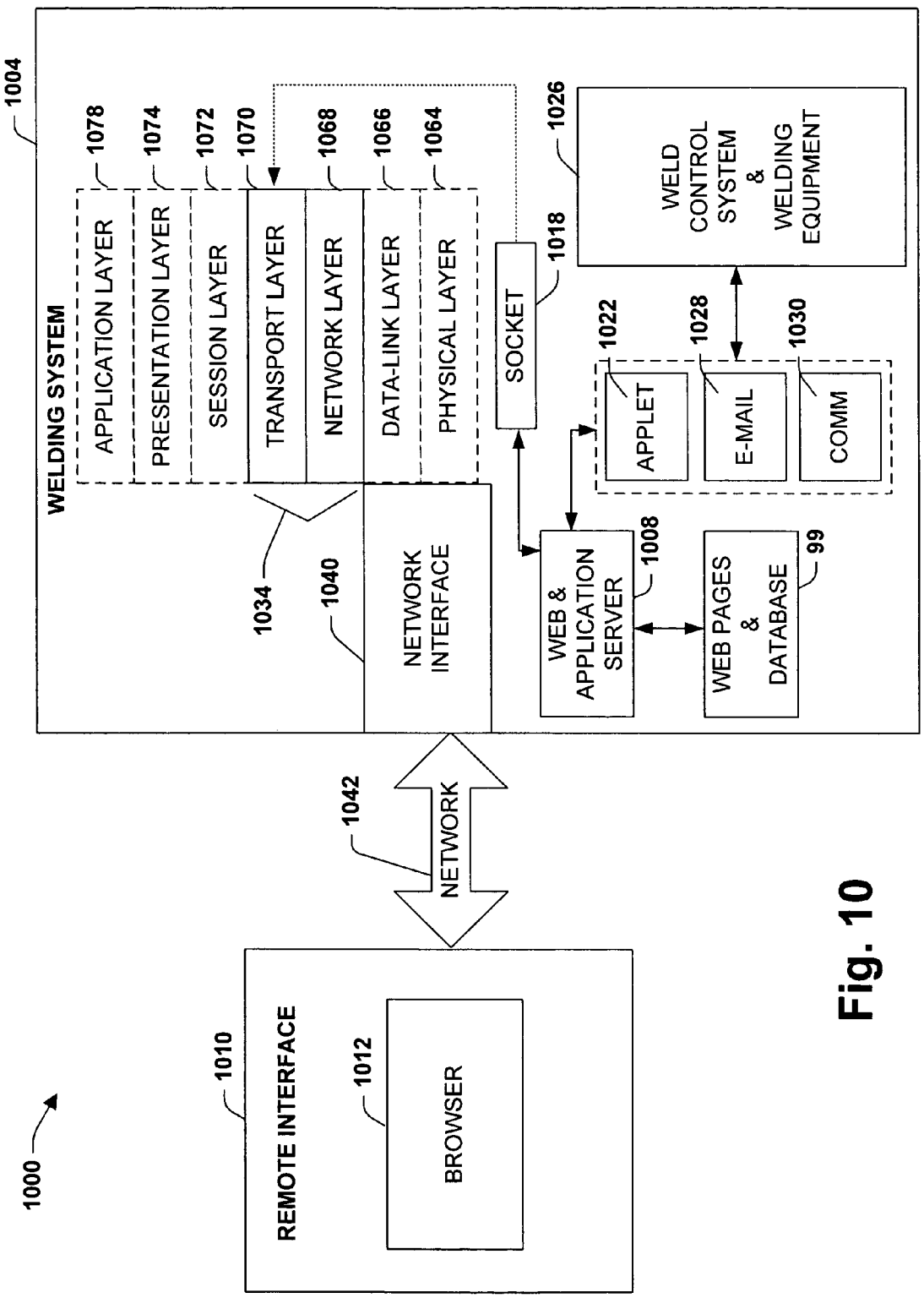
FIG. 10 illustrates a network communications architecture in accordance with the invention.

Referring now to FIG. 10, a system 1000 illustrates a more detailed network communications architecture in accordance with the invention. A welding system 1004 may include a web server 1008 that provides information exchange with a remote system 1010. The remote system 1010 may include a browser 1012 that communicates with the web server 1008. Welding information may be exchanged via web pages and/or content included within a database 1014 associated with the web server 1008. Web content may include but is not limited to such technologies as HTML, SHTML, VB Script, JAVA, CGI Script, JAVA Script, dynamic HTML, PPP, RPC, TELNET, TCP/IP, FTP, ASP, XML, PDF, WML as well as other formats. The browser 1012, which can reside in the remote system 1010 or other welding systems, communicates with the web server 1008 via one or more sockets 1018 and loads one or more objects such as an applet 1022.

It is noted that each object or applet 1022 may be associated with one or more sockets 1018. As an example, the browser 1012 may load a web page or other application from the welding server 1008 via a public domain or standard socket such as a Hyper Text Transfer Protocol (HTTP) socket, a File Transfer Protocol (FTP) socket, a Simple Mail Transfer Protocol (SMTP) socket, a Remote Procedure Call (RPC) socket, a Remote Method Invocation (RMI) socket, a Java Database Connectivity (JDBC) socket, an Open Database Connectivity (ODBC) socket, a Secure Sockets Layer (SSL) socket, a Network File System (NFS) socket, a Windows socket such as Winsock, a Point-of-Presence 3 (POP3) socket and a TELNET socket. The web page may then enable other welding applications to be invoked and communicated with by opening or "bootstrapping" additional sockets 1018 from a pool of public domain and/or custom sockets that interact with specific components and/or functionality within the welding system 1004.

For example, the applet 1022 may be configured to monitor welding components that communicate via a native welding system bus (not shown). When the applet 1022 is invoked and loaded from the remote system either from the browser 1012 and/or from another application, a Welding Application socket, such as a custom socket, and/or other public domain socket may be instantiated to exchange weld monitoring information between the applet 1022 and the remote system 1010. The Welding Application Socket (WAS) can be adapted to exchange a welding protocol between the remote system 1010 and the welding system 1004. Additionally, the WAS may be adapted to communicate with particular aspects and/or applications associated with the welding system (e.g., welding equipment, weld controller, weld monitor, consumable usage monitor) over an internal welding system bus, wherein the applications interact and communicate via the WAS to other local systems (e.g., web servers operatively coupled via a factory Intranet) and/or to remote systems (e.g., browsers, monitors, controllers, operatively couple via the Internet).

The applet 1022 (e.g., JAVA applet) may run within the browser 1012 to exchange information with the welding system 1004. A JAVA Virtual Machine (JVM) may be included to run the browser 1012 and execute the applets 1022. JAVA Virtual Machines are a software implementation of a "virtual CPU" designed to run compiled JAVA code. This may include stand-alone JAVA applications as well as the applets 1022 that are downloaded to run the browser 1012. The applet 1022 can further be configured to transmit welding operating data (e.g., arc start failure counts, consumable usage data, equipment utilization up/down time) to the manufacturer of the welding equipment, receive and display information (e.g., advertising, program upgrade, and product recall or upgrade, new product introduction, and applications and service support) from the manufacturer. The applet 1022 can also be adapted not to function (e.g., closes, sends error messages) unless the applet detects the presence of a welding power supply and/or other portion of the welding system from a named manufacturer and/or the presence of an Internet connection to the welding equipment manufacturer's data server.

Along with the applet 1022 for serving the browser 1012, the web server 1008 may invoke other objects or programs for interfacing to a weld control system and associated welding equipment 1026. For example, these programs may include an e-mail component 1028 for sending unsolicited and/or other messages to the remote system 1010 or to a client. A communications component 1030 may be provided to transfer files to or from the database 1014. For example, a File Transfer Protocol (FTP) component may be provided to transfer files. As described above, the socket 1018 interfaces with a TCP/IP stack 1034 that may be associated with several layers. The layers transfer data to and from a network interface 1040 that couples to the network 1042. It is noted that logic from one or more of the layers may be incorporated within the network interface 1040 and that more than one socket 1018 may be employed to communicate with various objects within the welding system 1004. For example, a stream socket may be employed that provides an end-to-end, connection-oriented link between two sockets utilizing TCP protocol. Another type socket is a datagram socket that is a connectionless service that utilizes User Datagram Protocol (UDP). UDP services are well suited to bursting traffic patterns and are employed to send control commands from the remote system 1010 to the welding system 1004. UDP enables a plurality of welding systems to receive control commands in a more concurrent manner.

As described above, the TCP/IP stack 1034, which is well understood, may be associated with one or more other network layers. A physical layer 1064 may be provided that defines the physical characteristics such as electrical properties of the network interface 1040. A data-link layer 1066 defines rules for sending information across a physical connection between systems. The TCP/IP stack 1034 may include a network layer 1068, which may include Internet protocol (IP) and/or Internet Protocol version 6 (IPv6), defines a protocol for opening and maintaining a path on the network 1040. A transport layer 1070 associated with the TCP/IP stack 1034, may include Transmission Control Protocol (TCP), that provides a higher level of control for moving information between systems. This may include more sophisticated error handling, prioritization, and security features. A session layer 1072, presentation layer 1074, and application layer 1078 which are well understood may also be optionally included that sit above the TCP/IP stack 1034.

It is noted that the server 1008 can be a web server or an HTTP server, wherein an application loaded from the welding system 1004 to the remote system 1010 can be a Java applet or a Java application, for example. The application may request web pages (e.g., HTML documents) from the welding system 1004 via an HTTP socket, wherein the web pages are dynamically generated by the welding system 1004 and may include live welder-operating parameters. The web pages may be parsed by the application to extract welder operating parameters, wherein the operating parameters can be displayed graphically within the browser 1012, processed by an algorithm, and/or recorded into a log file. Additionally, one or more URLs associated with the web pages may include commands, parameter settings changes, and/or instructions or functions to be executed by the welding system 1004, when the web pages are requested by the remote system 1010.

Figure 11:
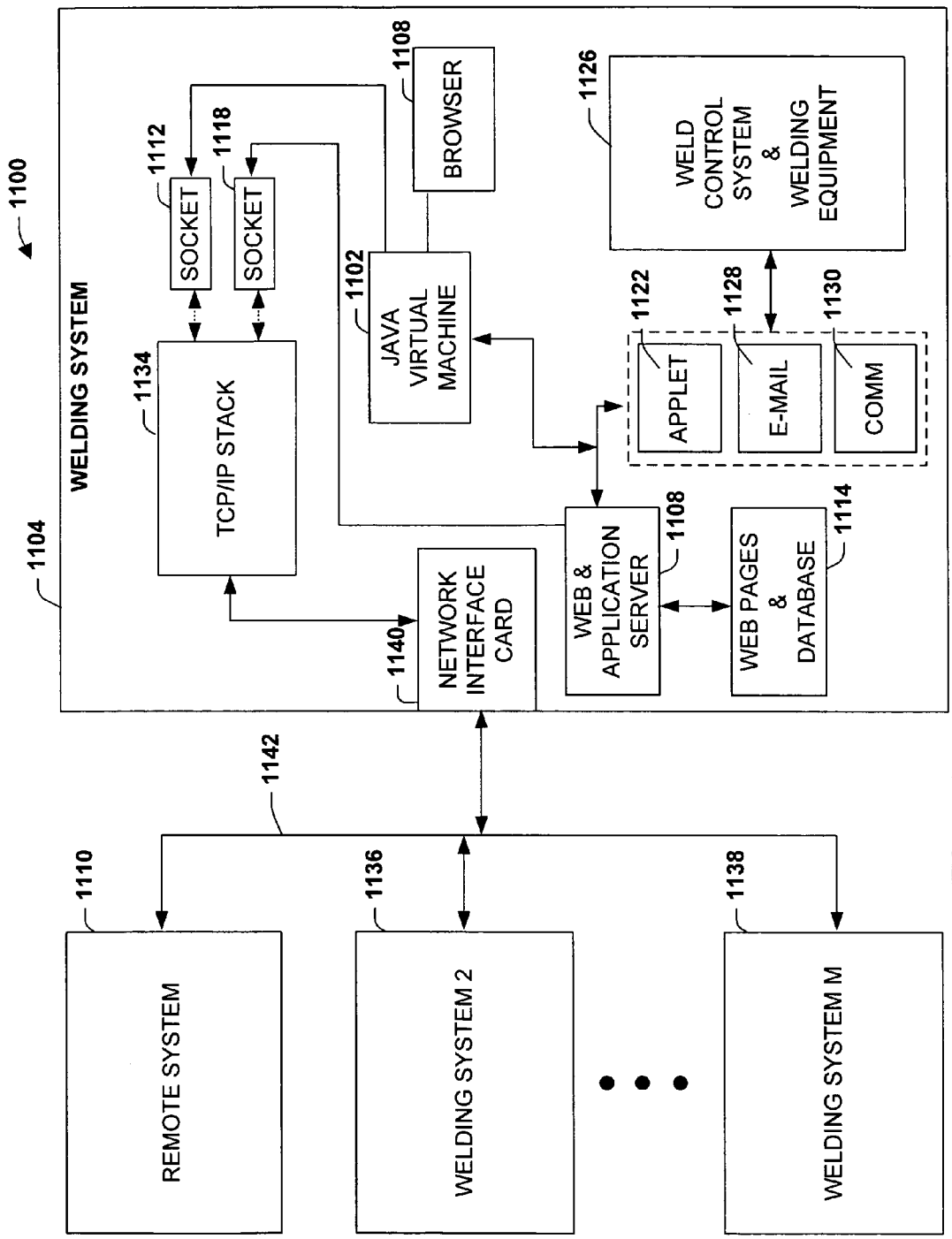
FIG. 11 illustrates an alternative architecture in accordance with the present invention.

Referring now to FIG. 11, a system 1100 illustrates an alternative aspect of the invention. According to this aspect of the invention, a Java Virtual Machine 1102 and associated browser 1108 may be included within the welding system 1104 to provide a local interface to one or more remote welding systems 1136-1138 and/or remote system 1110. This enables an operator, for example, to load welding information from other systems, monitor/diagnose the local system 1104 and/or other systems and send/receive orders from other systems. As illustrated, the JAVA Virtual Machine 1102 may execute a JAVA application or program 1109 and communicate to a socket 1112. The socket 1112 may be configured to interface between the JAVA applications/applets and the TCP/IP stack 1134 to enable network communications.

Figure 12:
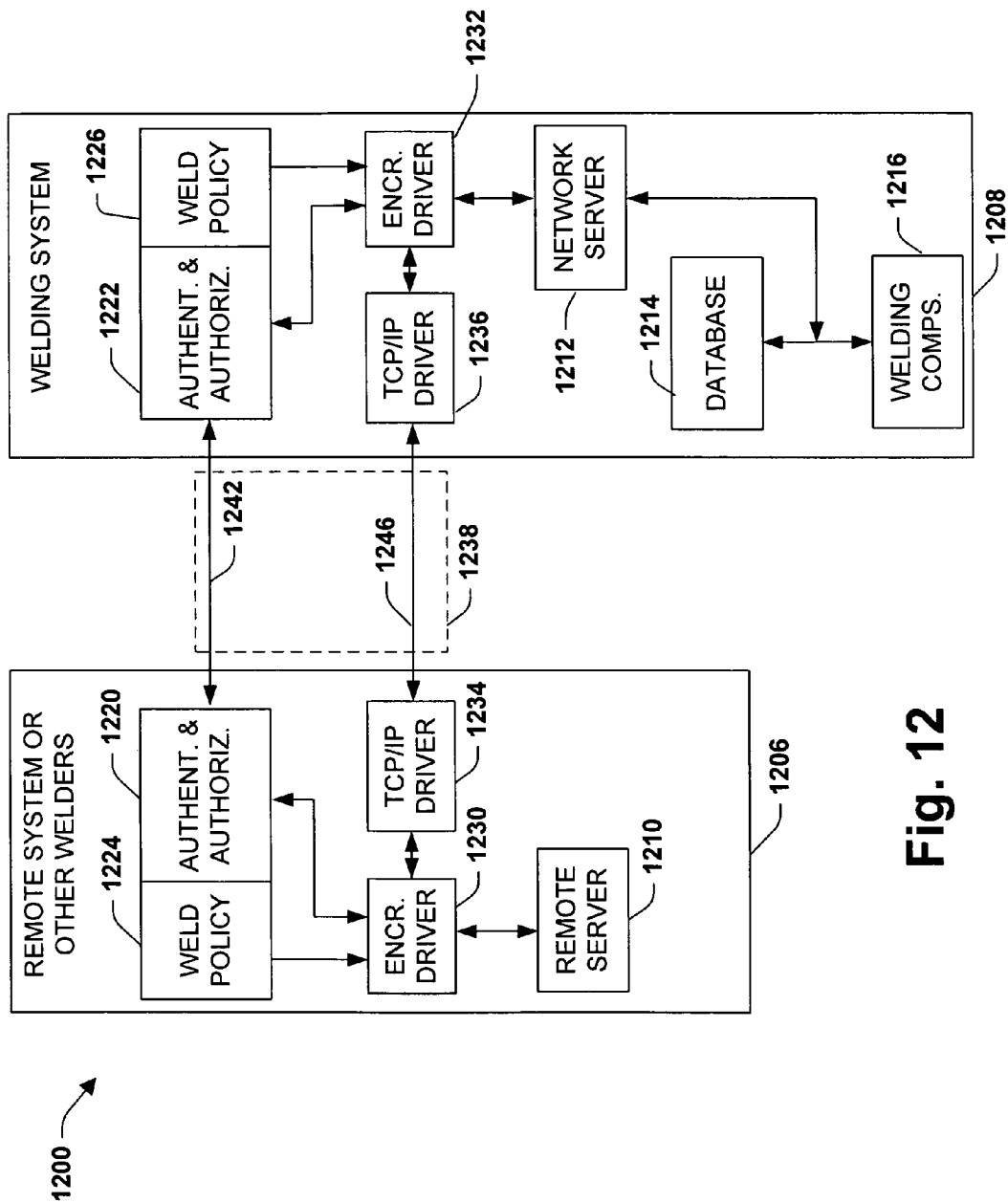
FIG. 12 illustrates a welding and network security system in accordance with an aspect of the invention.

Referring now to FIG. 12, a system 1200 illustrates a welding and network security system in accordance with an aspect of the invention. Given that welding information may be transferred over public networks such as the Internet, the system 1200 provides encrypted data communications along with authentication and authorization services between a remote system 1206 and one or more other welding systems 1208. The remote system 1206 may include a remote server 1210 to communicate with a network server 1212, database 1214, and associated weld components 1216 within the welding system 1208. Authentication refers to a determination that a purported user or system is whom they claim to be. Authorization is the process of verifying that a user or system has been authorized by the welding system 1208 to access welding system resources. Encryption is the conversion of data into a form, such as a ciphertest, that is not easily understood by unauthorized agents.

According to one aspect of the invention, authentication, authorization, and non-repudiation may be established utilizing one or more of the following protocols. A Public Key Infrastructure (PKI) and X.509 Public Key Infrastructure Certificates may be employed to provide authentication and message integrity. A Secure Sockets Layer (SSL) and Secure HTTP (SHTTP) may be employed to provide authentication and data encryption, wherein proprietary authentication and authorization techniques may be employed utilizing either publicly available encryption algorithms or those of custom design. These protocols, with the exception of those based on a custom design, are readily understood by those of ordinary skill in the art. They are defined in specifications provided in the Request for Comments (RFC) documents from the Internet Engineering Task Force (IETF) and in other sources.

According to another aspect of the invention, encryption may be established utilizing one or more of the following protocols. For example, a PGP, S/MIME protocol may be employed to provide encrypted email. An SSH and/or SSH2 protocol may be utilized to provide encrypted terminal sessions, wherein an Internet Protocol Security (IPSEC) protocol may be employed to provide data encryption. Cloaking techniques may also be employed utilizing either publicly available encryption algorithms and/or those of custom design. These protocols, with the exception those based on a custom design, are readily understood by those of ordinary skill in the art. They are defined in specifications provided in the appropriate Request for Comments (RFC) documents from the Internet Engineering Task Force (IETF) and in other sources.

The system 1200 includes an Authentication and Authorization (AA) subsystem 1220 and 1222 for securing network traffic 1238 between systems 1206 and 1208. The system 1200 may also include weld policy modules 1224 and 1226 to enable configuration of the AA subsystems 1220 and 1222. The weld policy modules 1224 and 1226 may also provide security configuration information to encryption drivers 1230 and 1232 that communicate via TCP/IP drivers 1234 and 1236 thereby enabling secure network traffic 1238 between the systems 1206 and 1208. A negotiation 1242 may be initiated between the AA subsystems 1220 and 1222 in order to establish a machine level and/or user level trust between the systems. It is to be appreciated that other negotiations may occur between the remote system 1206 and the welding system 1208. These negotiations may be utilized to establish a secure (e.g., encrypted) data channel 1246, for example, between the TCP/IP drivers 1234 and 1236.

The weld policy modules 1224 and 1226, retrieve a configured set of local security policies (e.g., from database or local cache) and distribute authentication and security settings to the AA modules 1220, 1222, and to the encryption Drivers 1230,1232. The security policies may be employed to define the levels of security and access provided to the welding system 1208. For example, these policies may define access based upon the type of user. A systems engineer or supervisor, for example, may be granted access to all portions of the welding system 1208 such as to enable configurations and or modifications within the welding system. In contrast, an operator may be granted another type of security, wherein only those portions of the welding system 1208 may be accessed to enable actual machine and/or manufacturing operations associated with the welding process. Welding policies may also be configured such that the type of machine, network access and/or location defines the level of access to the welding system 1208. For example, local systems communicating over a local factory Intranet may be given a higher degree of access to the welding system than remote systems communicating from outside the factory over the Internet. It is to be appreciated that many other policies and/or rule sets may be configured to define user, machine, and/or location access to the welding system 1208.

Figure 13:
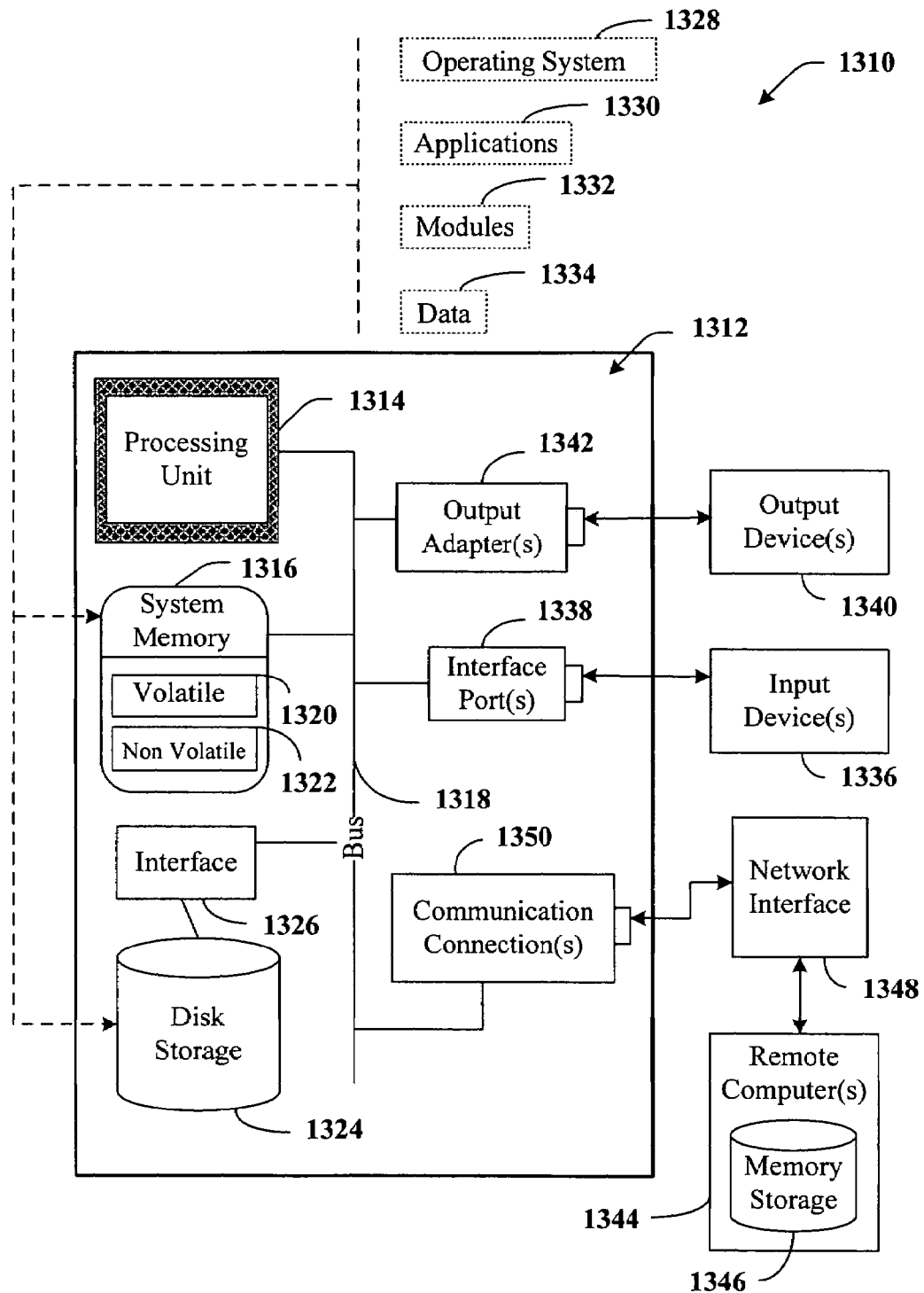
FIG. 13 an exemplary computing environment for implementing various aspects of the invention

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
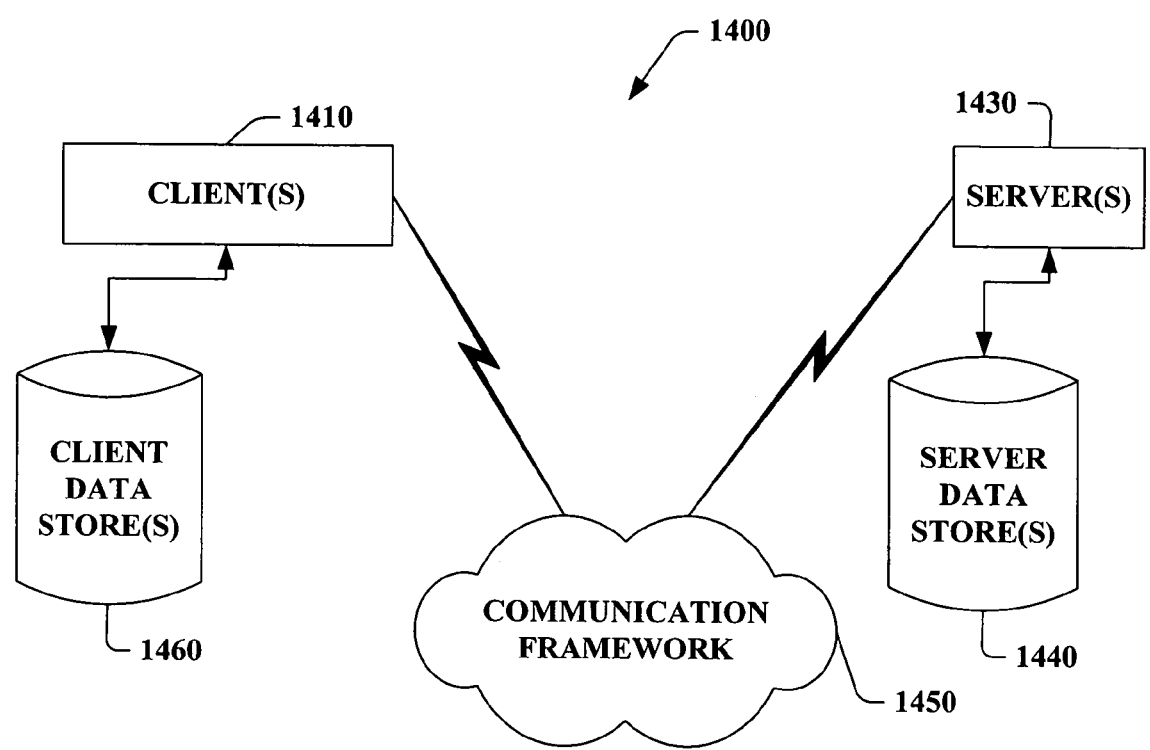
FIG. 14 is a schematic block diagram of a sample-computing environment with which the invention can interact.

FIG. 14 is a schematic block diagram of a sample-computing environment 1400 with which the invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the invention, for example. One possible communication between a client 1410 and a server 1430 may be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the invention. It is, of course, not possible to describe every conceivable combination of components or methodologies for purposes of describing the invention, but one of ordinary skill in the art may recognize that many further combinations and permutations of the invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A welding and network notification system, comprising:
   a receiving component that receives event information relating to a welding system;
   an analysis component that analyzes the received information and determines if a notification should be sent regarding the welding system; and
   a notification component that conveys the notification to a subset of a plurality of entities available to receive the notification, the subset determined based in part on the analyzed information and being most suitable to receive the notification or respond to the notification; and
   an artificial intelligence (AI) component that performs utility-based analyses in connection with determining entities and manner to convey notifications where the cost associated with respective processes in connection with a notification is weighed against the benefit of the notification.

2. The system of claim 1, the notification component identifies a subset of a plurality of communication modes to employ in connection with conveying the notification.

3. The system of claim 1, the notification component identifies a subset of a plurality of communication modalities to employ in connection with conveying the notification.

4. The system of claim 1, the AI component infers a most appropriate entity to send the notification.

5. The system of claim 4, the AI component further determining or inferring state of the entities.

6. The system of claim 1, the AI component infers what communications mode to employ in connection with conveying the notification.

7. The system of claim 1, the AI component infers what recipient device to employ in connection with conveying the notification.

8. The system of claim 1, farther comprising a context component that determines or infers context associated with a welding-related event.

9. The system of claim 1, the notification component sending a group of entities an e-mail notification relating to the welding event.

10. The system of claim 9, the notification component sending another group of entities an audio notification relating to the welding event.

11. The system of claim 1, the notification sending the notification in at least one of the following forms: e-mail, audio, video, text, graphics, instant message, a file, a document, an image or voice-mail.

12. The system of claim 1, further comprising a mapping component that facilitates matching entities to welding events.

13. The system of claim 1 further comprising a configurable address book.

14. The system of claim 13, each entry in the address book comprises an e-mail address and configuration information for determining when to send a recipient an e-mail.

15. The system of claim 13, the address book is stored in non-volatile memory.

16. The system of claim 1, wherein a welder further monitors for events, and categorizes subsets of the events.

17. The system of claim 16, wherein the welder time stamps the events.

18. The system of claim 1, the notification component conveys an e-mail, the subject and body of the e-mail is a function of the event.

19. The system of claim 18, the e-mail comprises an attachments related to the event.

20. The system of claim 19, the file attachments are sent using multipurpose Internet mail extensions (MIME).

21. The system of claim 18, the e-mail is sent to a simple mail transfer protocol (SMTP) server.

22. The system of claim 1, the notification component is an e-mail delivery system.

23. A computer executable method for conveying welding alerts, comprising:
   determining nature of an event;
   determining or inferring entities most suitable to receive information or respond to information in connection with the event;
   determining or inferring best manner in which to convey the notification; and
   analyzing cost associated with respective processes in connection with a notification, weighed against the benefit of the notification.

24. The method of claim 23 further comprising determining or inferring state of the entities.

25. The method of claim 23 further comprising sending notifications to the selected entities via most suitable modes and modalities of communication available.

26. A computer readable medium having stored on instructions executable by a computer for performing the method of claim 23.

27. A system for conveying welding alerts, comprising:
   means for determining nature of an event;
   means for inferring entities most suitable to receive information or respond to information in connection with the event;
   means for analyzing cost associated with respective processes in connection with a information, weighed against the benefit of the information; and
   means for inferring best manner in which to convey the information.

28. A welding system adapted for sending notifications, comprising:
   at least one welder having a network interface to communicate with a local or remote network system;
   a configurable address book associated with the network interface to identify most suitable recipients to receive a notification or respond to a notification;
   an event component to trigger the notification;
   a notification component to transmit the notification across the local or remote network system; and
   an artificial intelligence (AI) component that performs utility-based analyses in connection with determining entities and manner to convey notifications where the cost associated with respective processes in connection with a notification is weighed against the benefit of the notification.

29. The system of claim 28, the configurable address book includes e-mail addresses and associated configuration information to determine when to send the notification.

30. The system of claim 28, at least one entry in the configurable address book is reserved as a support address.

31. The system of claim 28, the configurable address book is stored in non-volatile memory.

32. The system of claim 28, the event component manages one or more events that are categorized into one or more groups.

33. The system of claim 32, the groups are associated with a subset of recipients on the configurable address book.

34. The system of claim 32, further comprising a real time clock for time-stamping the events.

* * * * *